US012288546B2

(12) United States Patent
Shirakihara et al.

(10) Patent No.: US 12,288,546 B2
(45) Date of Patent: Apr. 29, 2025

(54) LIVE DATA DISTRIBUTION METHOD, LIVE DATA DISTRIBUTION SYSTEM, AND LIVE DATA DISTRIBUTION APPARATUS

(71) Applicant: YAMAHA CORPORATION, Hamamatsu (JP)

(72) Inventors: Futoshi Shirakihara, Hamamatsu (JP); Tadashi Morikawa, Hamamatsu (JP); Kentaro Noto, Hamamatsu (JP); Katsumi Ishikawa, Hamamatsu (JP); Hiraku Okumura, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 154 days.

(21) Appl. No.: 17/942,644

(22) Filed: Sep. 12, 2022

(65) Prior Publication Data

US 2023/0005464 A1 Jan. 5, 2023

Related U.S. Application Data

(63) Continuation of application No. PCT/JP2021/011374, filed on Mar. 19, 2021.

(30) Foreign Application Priority Data

Nov. 27, 2020 (WO) .................. PCT/JP2020/044293

(51) Int. Cl.
*G10K 15/08* (2006.01)
*H04S 7/00* (2006.01)

(52) U.S. Cl.
CPC ................ *G10K 15/08* (2013.01); *H04S 7/30* (2013.01)

(58) Field of Classification Search
CPC .......... G10K 15/08; G10K 15/02; H04S 7/30; H04S 7/305; H04R 2227/007; H04R 27/00
See application file for complete search history.

(56) References Cited

U.S. PATENT DOCUMENTS

| | | | | |
|---|---|---|---|---|
| 9,532,158 | B2 | 12/2016 | Lando et al. | |
| 11,096,006 | B1 * | 8/2021 | Robinson | H04S 7/305 |
| 2007/0025560 | A1 | 2/2007 | Asada | |
| 2017/0099557 | A1 * | 4/2017 | Saunders | H04S 7/305 |
| 2017/0127035 | A1 | 5/2017 | Kon et al. | |

(Continued)

FOREIGN PATENT DOCUMENTS

| | | | |
|---|---|---|---|
| CN | 109983786 | A | 7/2019 |
| EP | 3547718 | A1 | 10/2019 |

(Continued)

OTHER PUBLICATIONS

International Search Report issued in Intl. Appln. No. PCT/JP2021/011374 mailed on May 25, 2021. English translation provided.

(Continued)

*Primary Examiner* — Akelaw Teshale
(74) *Attorney, Agent, or Firm* — ROSSI, KIMMS & McDOWELL LLP

(57) ABSTRACT

A live data distribution method obtains information on a sound source according to sound generated at the first venue, and information on space reverberation, as distribution data, distributes the distribution data to the second venue, and renders the distribution data and providing sound according to the distribution data at the second venue.

20 Claims, 18 Drawing Sheets

(56) References Cited

U.S. PATENT DOCUMENTS

| | | | |
|---|---|---|---|
| 2017/0372748 A1 | 12/2017 | McCauley et al. | |
| 2018/0146262 A1 | 5/2018 | Murugan | |
| 2018/0199143 A1 | 7/2018 | Hosoda et al. | |
| 2019/0019495 A1 | 1/2019 | Asada et al. | |
| 2019/0105568 A1 | 4/2019 | Platt et al. | |
| 2020/0053499 A1* | 2/2020 | Tsuji | H04N 9/87 |
| 2020/0251073 A1 | 8/2020 | Kano et al. | |
| 2020/0388296 A1* | 12/2020 | Von Tuerckheim | G10L 19/00 |
| 2021/0112287 A1 | 4/2021 | Lee et al. | |
| 2021/0120356 A1* | 4/2021 | Elby | G06F 3/1407 |
| 2021/0120358 A1* | 4/2021 | Elby | H04S 7/303 |
| 2021/0345058 A1 | 11/2021 | Itakura et al. | |
| 2022/0159400 A1 | 5/2022 | Tsuji et al. | |
| 2023/0007421 A1 | 1/2023 | Shirakihara et al. | |

FOREIGN PATENT DOCUMENTS

| | | | |
|---|---|---|---|
| JP | 2003330477 | A | 11/2003 |
| JP | 2005339479 | A | 12/2005 |
| JP | 2007041164 | A | 2/2007 |
| JP | 2015530043 | A | 10/2015 |
| JP | 2016051675 | A | 4/2016 |
| JP | 2018191127 | A | 11/2018 |
| JP | 2019024157 | A | 2/2019 |
| JP | 2019192975 | A | 10/2019 |
| JP | 2020053791 | A | 4/2020 |
| WO | 9621321 | A1 | 7/1996 |
| WO | 2014035902 | A2 | 3/2014 |
| WO | 2017094326 | A1 | 6/2017 |
| WO | 2018096954 | A1 | 5/2018 |

OTHER PUBLICATIONS

Written Opinion issued in Intl. Appln. No. PCT/JP2021/011374 mailed on May 25, 2021.

International Search Report issued in Intl. Appln. No. PCT/JP2020/044293 mailed on Feb. 2, 2021. English translation provided.

Written Opinion issued in Intl. Appln. No. PCT/JP2020/044293 mailed on Feb. 2, 2021.

English translation of Written Opinion issued in Intl. Appln. No. PCT/JP2021/011374 mailed on May 25, 2021, previously cited in IDS filed Sep. 12, 2022.

English translation of Written Opinion issued in Intl. Appln. No. PCT/JP2020/044293 mailed on Feb. 2, 2021, previously cited in IDS filed Sep. 12, 2022.

Office Action issued in Japanese Appln. No. 2022-565035 mailed Jun. 11, 2024. English machine translation provided.

International Search Report issued in Intl. Appln. No. PCT/JP2021/011381 mailed on May 25, 2021. English translation provided.

Written Opinion issued in Intl. Appln. No. PCT/JP2021/011381 mailed on May 25, 2021. English translation provided.

International Search Report issued in Intl. Appln. No. PCT/JP2020/044294 mailed on Feb. 2, 2021. English translation provided.

Written Opinion issued in Intl. Appln. No. PCT/JP2020/044294 mailed on Feb. 2, 2021. English translation provided.

Office Action issued in U.S. Appl. No. 17/942,732 mailed May 29, 2024.

Office Action issued in Japanese Appln. No. 2022-565036 mailed Jun. 11, 2024. English machine translation provided.

Office Action issued in Chinese Appln. No. 202180009062.7 mailed Jun. 12, 2024. English machine translations provided.

Office Action issued in Chinese Appln. No. 202180009216.2, mailed Jul. 23, 2024. English translation provided.

Office Action issued in U.S. Appl. No. 17/942,732 mailed Oct. 11, 2024.

Office Action issued in Japanese Patent Application No. 2022-565035, mailed Sep. 17, 2024. English translation provided.

Extended European Search Report issued in European Appln. No. 21897373.3 mailed Oct. 2, 2024.

Extended European Search Report issued in European Appln. No. 21897374.1 mailed Oct. 2, 2024.

Notice of Allowance issued in U.S. Appl. No. 17/942,732, mailed Jan. 30, 2025.

Office Action issued in Chinese Appln. No. 202180009216.2, mailed Feb. 28, 2025.

Notice Action issued in Chinese Appln. No. 202180009216.2, mailed Feb. 28, 2025.

* cited by examiner

LIVE DATA DISTRIBUTION METHOD, LIVE DATA DISTRIBUTION SYSTEM, AND LIVE DATA DISTRIBUTION APPARATUS

CROSS REFERENCE TO RELATED APPLICATIONS

The present application is a continuation application of International Patent Application No. PCT/JP2021/011374, filed on Mar. 19, 2021, which claims priority to International Patent Application No. PCT/JP2020/044293, filed on Nov. 27, 2020. The contents of these applications are incorporated herein by reference in their entirety.

BACKGROUND

An embodiment of the present disclosure relates to a live data distribution method, a live data distribution system, and a live data distribution apparatus.

In Japanese Unexamined Patent Application Publication No. 2015-530043, in order to provide a more immersive spatial audio experience, a system to render spatial audio content in a listening environment is disclosed.

It is described that the system of Japanese Unexamined Patent Application Publication No. 2015-530043 measures an impulse response of a sound to be outputted from a speaker in the listening environment, and performs filter processing according to a measured impulse response.

SUMMARY

The system of Japanese Unexamined Patent Application Publication No. 2015-530043 is not a distribution system for live data. In a case in which the live data is distributed, realistic sensation in a live venue is also desired to be provided to a venue being a distribution destination.

An embodiment of the present disclosure is directed to provide a live data distribution method, a live data distribution system, and a live data distribution apparatus that, in a case in which live data is distributed, are also able to provide realistic sensation in a live venue, to a venue being a distribution destination.

A live data distribution method obtains information on a sound source according to sound generated at the first venue, and information on space reverberation, as distribution data, distributes the distribution data to the second venue, and renders the distribution data and providing sound according to the distribution data at the second venue.

DETAILED DESCRIPTION

Figure 1:
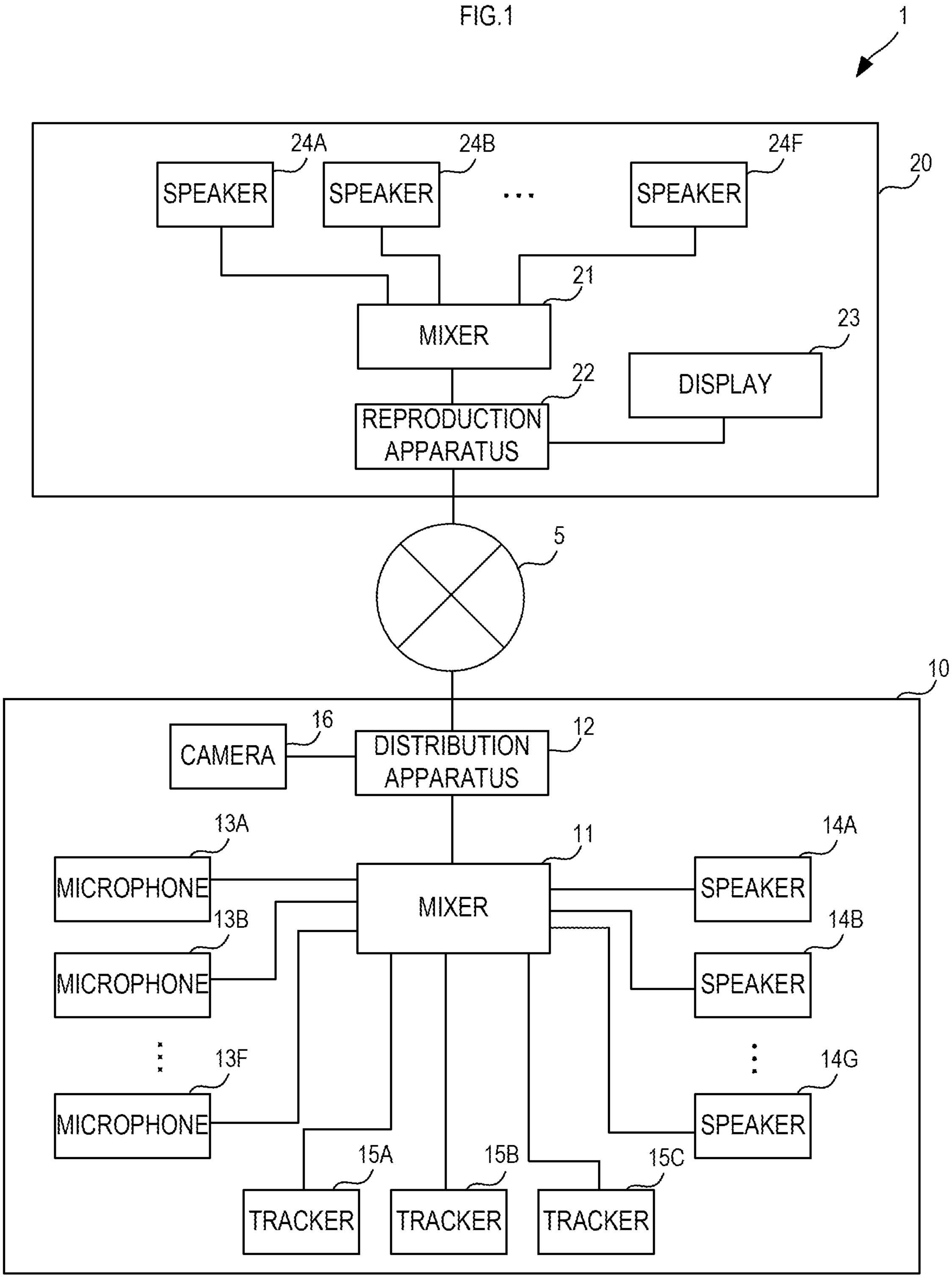
FIG. 1 is a block diagram showing a configuration of a live data distribution system 1.

FIG. 1 is a block diagram showing a configuration of a live data distribution system 1. The live data distribution system 1 includes a plurality of acoustic devices and information processing apparatuses that are installed in each of a first venue 10 and a second venue 20.

Figure 2:
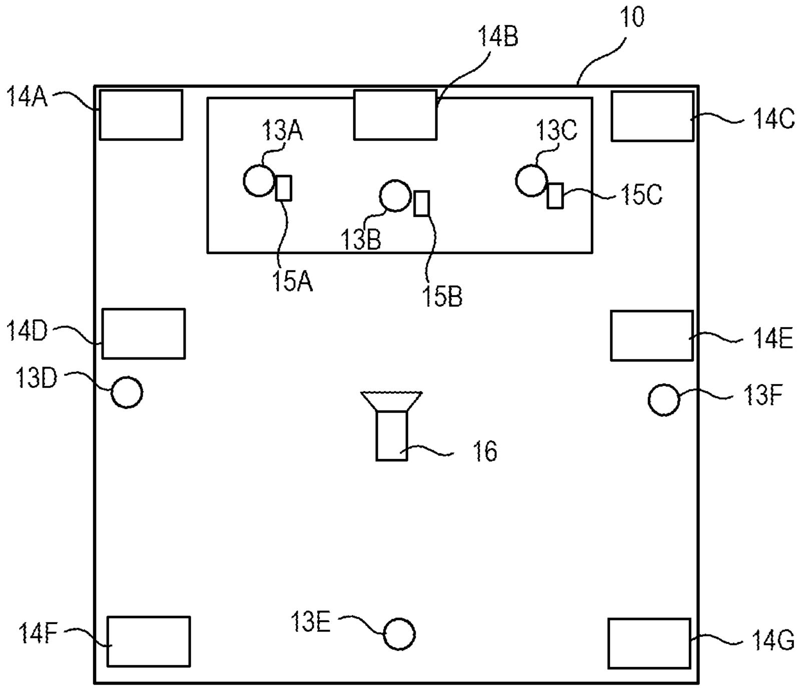
FIG. 2 is a plan schematic diagram of a first venue 10.
Figure 3:
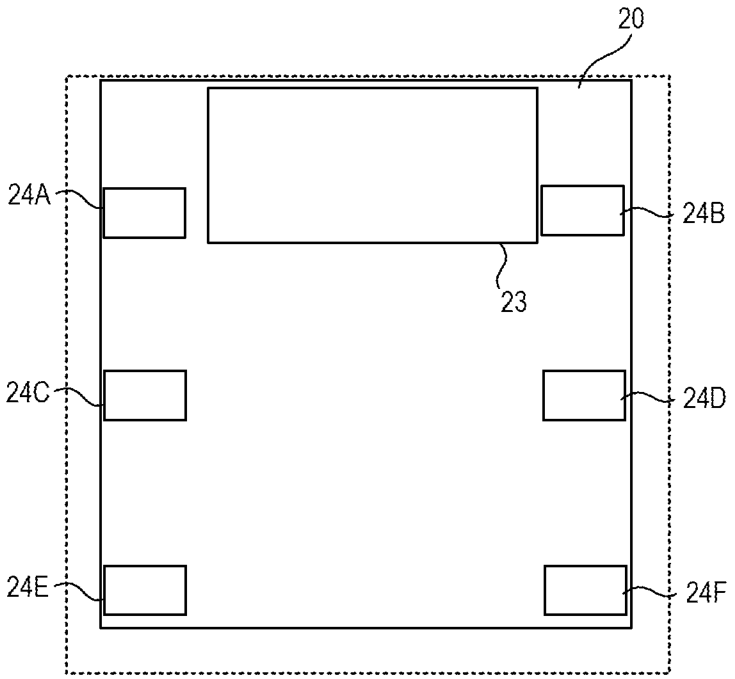
FIG. 3 is a plan schematic diagram of a second venue 20.

FIG. 2 is a plan schematic diagram of a first venue 10, and FIG. 3 is a plan schematic diagram of a second venue 20. In this example, the first venue 10 is a live venue in which a performer performs a performance. The second venue 20 is a public viewing venue in which a listener at a remote place watches the performance by the performer.

A mixer 11, a distribution apparatus 12, a plurality of microphones 13A to 13F, a plurality of speakers 14A to 14G, a plurality of trackers 15A to 15C, and a camera 16 are installed in the first venue 10. A mixer 21, a reproduction apparatus 22, a display 23, and a plurality of speakers 24A to 24F are installed in the second venue 20. The distribution apparatus 12 and the reproduction apparatus 22 are connected through Internet 5. It is to be noted that the number of microphones, the number of speakers, the number of trackers, and the like are not limited to the number shown in the present embodiment. In addition, the installation mode of the microphones and the speakers is not limited to the example shown in the present embodiment.

The mixer 11 is connected to the distribution apparatus 12, the plurality of microphones 13A to 13F, the plurality of speakers 14A to 14G, and the plurality of trackers 15A to 15C. The mixer 11, the plurality of microphones 13A to 13F, and the plurality of speakers 14A to 14G are connected through a network cable or an audio cable. The plurality of trackers 15A to 15C are connected to the mixer 11 through wireless communication. The mixer 11 and the distribution apparatus 12 are connected to each other through a network cable. In addition, the distribution apparatus 12 is connected to the camera 16 through a video cable. The camera 16 captures a live video including a performer.

The plurality of speaker 14A to the speaker 14G are installed along a wall surface of the first venue 10. The first venue 10 of this example has a rectangular shape in a plan view. A stage is disposed at the front of the first venue 10. On the stage, a performer performs a performance such as singing or playing. The speaker 14A is installed on the left side of the stage, the speaker 14B is installed in the center of the stage, and the speaker 14C is installed on the right side of the stage. The speaker 14D is installed on the left side of the center of the front and rear of the first venue 10, and the speaker 14E is installed on the right side of the center of the front and rear of the first venue 10. The speaker 14F is installed on the rear left side of the first venue 10, and the speaker 14G is installed on the rear right side of the first venue 10.

The microphone 13A is installed on the left side of the stage, the microphone 13B is installed in the center of the stage, and the microphone 13C is installed on the right side of the stage. The microphone 13D is installed on the left side of the center of the front and rear of the first venue 10, and the microphone 13E is installed in the rear center of the first venue 10. The microphone 13F is installed on the right side of the center of the front and rear of the first venue 10.

The mixer 11 receives an audio signal from the microphones 13A to 13F. In addition, the mixer 11 outputs the audio signal to the speakers 14A to 14G. While the present embodiment shows the speaker and the microphone as an example of an acoustic device to be connected to the mixer 11, in practice, a greater number of acoustic devices may be connected to the mixer 11. The mixer 11 receives an audio signal from the plurality of acoustic devices such as microphones, performs signal processing such as mixing, and outputs the audio signal to the plurality of acoustic devices such as speakers.

The microphones 13A to 13F each obtain a singing sound or playing sound of a performer, as a sound generated in the first venue 10. Alternatively, the microphones 13A to 13F obtain an ambient sound of the first venue 10. In the example of FIG. 2, the microphones 13A to 13C obtain the sound of the performer, and the microphones 13D to 13F obtain the ambient sound. The ambient sound includes a sound such as a cheer, applause, calling, shout, chorus, or murmur of a listener. However, the sound of the performer may be line-inputted. Line-input does not mean receiving an input of a sound outputted from a sound source such as a musical instrument by collecting the sound with a microphone, but means receiving an input of an audio signal from an audio cable or the like connected to the sound source. The sound of the performer may be preferably obtained with a high SN ratio and may not preferably include other sounds.

The speaker 14A to the speaker 14G output the sound of the performer to the first venue 10. The speaker 14A to the speaker 14G may output an early reflected sound or a late reverberant sound for controlling a sound field of the first venue 10.

The mixer 21 at the second venue 20 is connected to the reproduction apparatus 22 and the plurality of speakers 24A to 24F. These acoustic devices are connected through the network cable or the audio cable. In addition, the reproduction apparatus 22 is connected to the display 23 through the video cable.

The plurality of speaker 24A to the speaker 24F are installed along a wall surface of the second venue 20. The second venue 20 of this example has a rectangular shape in a plan view. The display 23 is disposed at the front of the second venue 20. A live video captured at the first venue 10 is displayed on the display 23. The speaker 24A is installed on the left side of the display 23, and the speaker 24B is installed on the right side of the display 23. The speaker 24C is installed on the left side of the center of the front and rear of the second venue 20, and the speaker 24D is installed on the right side of the center of the front and rear of the second venue 20. The speaker 24E is installed on the rear left side of the second venue 20, and the speaker 24F is installed on the rear right side of the second venue 20.

The mixer 21 outputs the audio signal to the speakers 24A to 24F. The mixer 21 receives an audio signal from the reproduction apparatus 22, performs signal processing such as mixing, and outputs the audio signal to the plurality of acoustic devices such as speakers.

The speaker 24A to the speaker 24F output the sound of the performer to the second venue 20. In addition, the speaker 24A to the speaker 24F output an early reflected sound or a late reverberant sound for reproducing the sound field of the first venue 10. Moreover, the speaker 24A to the speaker 24F output an ambient sound such as a shout of the listener in the first venue 10, to the second venue 20.

Figure 4:
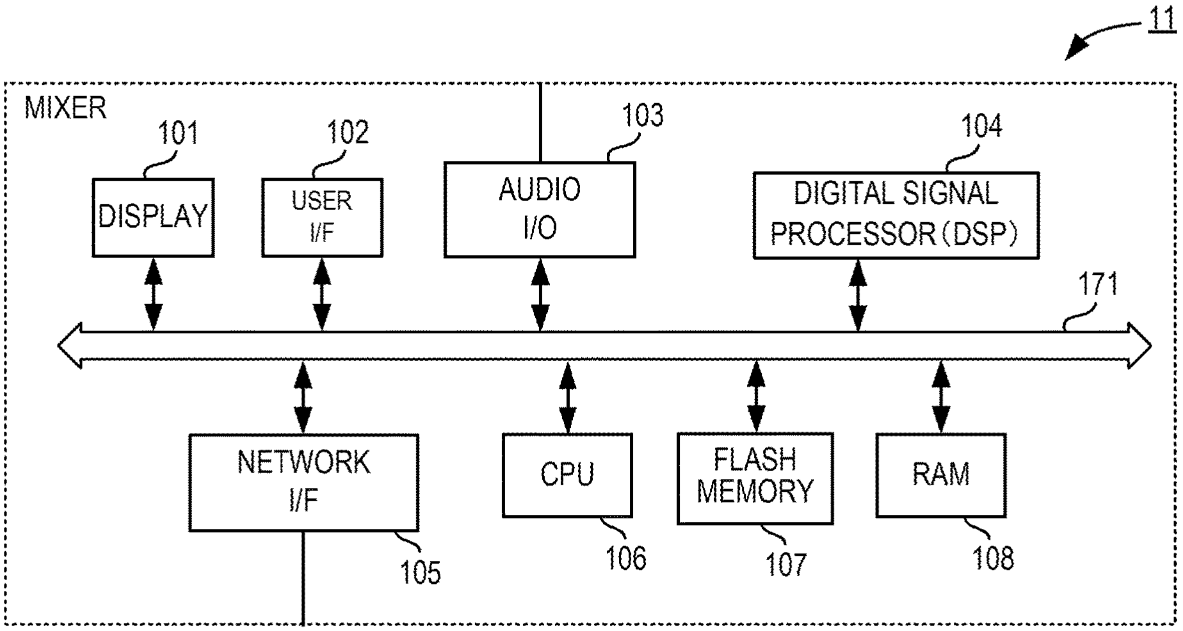
FIG. 4 is a block diagram showing a configuration of a mixer 11.

FIG. 4 is a block diagram showing a configuration of the mixer 11. It is to be noted that, since the mixer 21 has the same configuration and function as the mixer 11, FIG. 4 shows the configuration of the mixer 11 as a representative example. The mixer 11 includes a display 101, a user I/F 102, an audio I/O (Input/Output) 103, a digital signal processor (DSP) 104, a network I/F 105, a CPU 106, a flash memory 107, and a RAM 108.

The CPU 106 is a controller that controls an operation of the mixer 11. The CPU 106 reads and executes a predetermined program stored in the flash memory 107 being a storage medium to the RAM 108 and performs various types of operations.

It is to be noted that the program that the CPU 106 reads does not need to be stored in the flash memory 107 in the own apparatus. For example, the program may be stored in a storage medium of an external apparatus such as a server. In such a case, the CPU 106 may read out the program each time from the server to the RAM 108 and may execute the program.

The digital signal processor 104 includes a DSP for performing various types of signal processing. The digital signal processor 104 performs signal processing such as mixing processing and filter processing, on an audio signal inputted from an acoustic device such as a microphone, through the audio I/O 103 or the network I/F 105. The digital signal processor 104 outputs the audio signal on which the signal processing has been performed, to an acoustic device such as a speaker, through the audio I/O 103 or the network I/F 105.

In addition, the digital signal processor 104 may perform panning processing, early reflected sound generation processing, and late reverberant sound generation processing. The panning processing is processing to control the volume of an audio signal to be distributed to the plurality of speakers 14A to 14G so that an acoustic image may be localized at a position of a performer. In order to perform the panning processing, the CPU 106 obtains position information of the performer through the trackers 15A to 15C. The position information is information that shows two-dimensional or three-dimensional coordinates on the basis of a certain position of the first venue 10. The trackers 15A to 15C are tags that send and receive radio waves such as Bluetooth (registered trademark), for example. The performer or the musical instrument is equipped with the trackers 15A to 15C. At least three beacons are previously installed in the first venue 10. Each beacon measures a distance with the trackers 15A to 15C, based on a time difference from when sending radio waves until when receiving the radio waves. The CPU 106 previously obtains position information of the beacon, and is able to uniquely determine a position of the trackers 15A to 15C by measuring a distance from each of the at least three beacons to a tag.

The CPU 106, in such a manner, obtains position information of each performer, that is, position information of the sound generated in the first venue 10, through the trackers 15A to 15C. The CPU 106 determines the volume of each audio signal outputted to the speaker 14A to the speaker 14G so that an acoustic image may be localized at the position of the performer, based on obtained position information and the position of the speaker 14A to the speaker 14G. The digital signal processor 104 controls the volume of each audio signal outputted to the speaker 14A to the speaker 14G, according to control of the CPU 106. For example, the digital signal processor 104 increases the volume of the audio signal outputted to a speaker near the position of the performer, and reduces the volume of the audio signal outputted to a speaker far from the position of the performer. As a result, the digital signal processor 104 is able to localize an acoustic image of a playing sound or a singing sound of the performer, at a predetermined position.

The early reflected sound generation processing and the late reverberant sound generation processing are processing to convolve an impulse response into the sound of the performer by an FIR filter. The digital signal processor 104 convolves the impulse response previously obtained, for example, at a predetermined venue (a venue other than the first venue 10) into the sound of the performer. As a result, the digital signal processor 104 controls the sound field of the first venue 10. Alternatively, the digital signal processor 104 may control the sound field of the first venue 10 by further feeding back the sound obtained by the microphone installed near the ceiling or wall surface of the first venue 10, to the speaker 14A to the speaker 14G.

The digital signal processor 104 outputs the sound of the performer and the position information of the performer, to the distribution apparatus 12. The distribution apparatus 12 obtains the sound of the performer and the position information of the performer from the mixer 11.

In addition, the distribution apparatus 12 obtains a video signal from the camera 16. The camera 16 captures each performer, the entirety of the first venue 10, or the like, and outputs a video signal according to a live video, to the distribution apparatus 12.

Furthermore, the distribution apparatus 12 obtains information on space reverberation of the first venue 10. The information on space reverberation includes information for generating an indirect sound. The indirect sound is a sound such that a sound of a sound source may be reflected in a venue and may reach a listener, and includes at least an early reflected sound and a late reverberant sound. The information on space reverberation includes information that shows the size, shape, and wall surface material quality of the space of the first venue 10, and an impulse response according to the late reverberant sound, for example. The information that shows the size, shape, and wall surface material quality of the space is information for generating an early reflected sound. The information for generating the early reflected sound may be an impulse response. The impulse response is previously measured, for example, in the first venue 10. The information on space reverberation may be information that varies according to a position of a performer. The information that varies according to a position of a performer is an impulse response previously measured for each position of a performer in the first venue 10, for example. The distribution apparatus 12 obtains, for example, a first impulse response when a sound of a performer is generated at the front of the stage of the first venue 10, a second impulse response when a sound of a performer is generated at the left of the stage, and a third impulse response when a sound of a performer is generated at the right of the stage. However, impulse responses are not limited to three. In addition, the impulse response is not necessary to be actually measured in the first venue 10, and, for example, may be calculated by simulation from the size, shape, wall surface material quality, and the like of the space of the first venue 10.

It is to be noted that the early reflected sound is a reflected sound of which the arrival direction of a sound is fixed, and the late reverberant sound is a reflected sound of which the arrival direction of a sound is not fixed. The late reverberant sound is less affected by a variation in the position of the sound of the performer than the early reflected sound. Therefore, the information on space reverberation may include an impulse response of the early reflected sound that varies according to the position of the performer and an impulse response of the late reverberant sound that is constant independent of the position of the performer.

In addition, the digital signal processor 104 may obtain ambience information according to an ambient sound, and may output the ambience information to the distribution apparatus 12. The ambient sound is a sound obtained by the microphones 13D to 13F as described above, and includes a sound such as background noise, and a cheer, applause, calling, shout, chorus, or murmur of a listener. However, the ambient sound may be obtained by the microphones 13A to 13C on the stage. The digital signal processor 104 outputs an audio signal according to the ambient sound, to the distribution apparatus 12, as ambience information. It is to be noted that, the ambience information may include position information of the ambient sound. Of the ambient sound, a cheer such as “Go for it” from an individual listener, calling for a name of an individual performer, an exclamation such as “Bravo,” or the like is a sound that is able to be recognized as a voice of the individual listener without being lost in an audience. The digital signal processor 104 may obtain position information of these individual sounds. The position information of the ambient sound is able to be determined from the sound obtained by the microphones 13D to 13F, for example. The digital signal processor 104, in a case of recognizing the individual sounds by processing such as speech recognition, determines the correlation of an audio signal of the microphones 13D to 13F, and determines a difference in timing when the individual sounds are respectively collected by the microphones 13D to 13F. The digital signal processor 104, based on the difference in timing when the sounds are collected by the microphones 13D to 13F, is able to uniquely determine a position in the first venue 10 in which the sound is generated. In addition, the position information of the ambient sound may be considered as the position information of each microphone 13D to 13F.

The distribution apparatus 12 encodes and distributes information on a sound source according to the sound generated in the first venue 10, and information on space reverberation, as distribution data. The information on a sound source includes at least a sound of a performer, and may include position information of the sound of the performer. In addition, the distribution apparatus 12 may distribute the distribution data including ambience information according to an ambient sound. The distribution apparatus 12 may distribute the distribution data including a video signal according to a video of the performer.

Alternatively, the distribution apparatus 12 may distribute at least information on a sound source according to a sound of a performer and position information of the performer, and ambience information according to an ambient sound, as distribution data.

Figure 5:
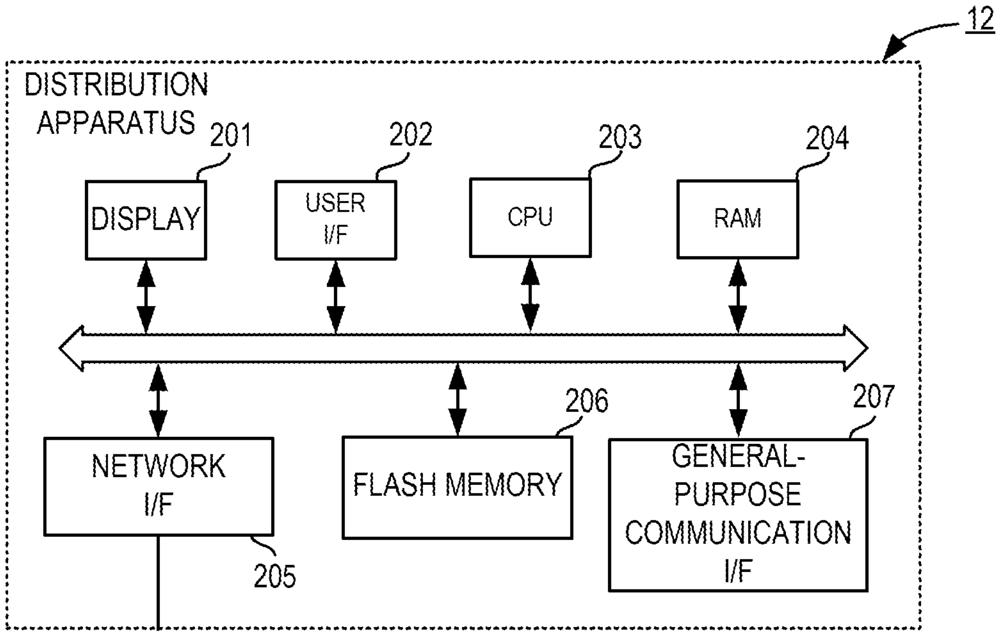
FIG. 5 is a block diagram showing a configuration of a distribution apparatus 12.
Figure 6:
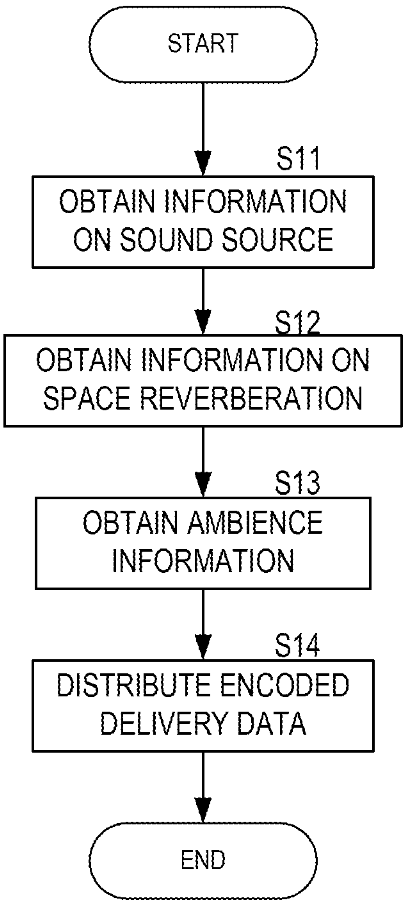
FIG. 6 is a flow chart showing an operation of the distribution apparatus 12.

FIG. 5 is a block diagram showing a configuration of the distribution apparatus 12. FIG. 6 is a flow chart showing an operation of the distribution apparatus 12.

The distribution apparatus 12 includes an information processing apparatus such as a general personal computer. The distribution apparatus 12 includes a display 201, a user I/F 202, a CPU 203, a RAM 204, a network I/F 205, a flash memory 206, and a general-purpose communication I/F 207.

The CPU 203 reads out a program stored in the flash memory 206 being a storage medium to the RAM 204 and implements a predetermined function. It is to be noted that the program that the CPU 203 reads out does not also need to be stored in the flash memory 206 in the own apparatus. For example, the program may be stored in a storage medium of an external apparatus such as a server. In such a case, the CPU 203 may read out the program each time from the server to the RAM 204 and may execute the program.

The CPU 203 obtains a sound of a performer and position information (information on a sound source) of the performer, from the mixer 11 through the network I/F 205 (S11). In addition, the CPU 203 obtains information on space reverberation of the first venue 10 (S12). Furthermore, the CPU 203 obtains ambience information according to an ambient sound (S13). Moreover, the CPU 203 may obtain a video signal from the camera 16 through the general-purpose communication I/F 207.

The CPU 203 encodes and distributes data according to the position information (the information on a sound source) of the sound of the performer and the sound, data according to the information on space reverberation, data according to the ambience information, and data according to the video signal, as distribution data (S14).

The reproduction apparatus 22 receives the distribution data from the distribution apparatus 12 through the Internet 5. The reproduction apparatus 22 renders the distribution data and provides a sound of the performer and a sound according to the space reverberation, to the second venue 20. Alternatively, the reproduction apparatus 22 provides the ambient sound included in the sound of the performer and the ambience information, to the second venue 20. The reproduction apparatus 22 may provide the sound according to the space reverberation corresponding to the ambience information, to the second venue 20.

Figure 7:
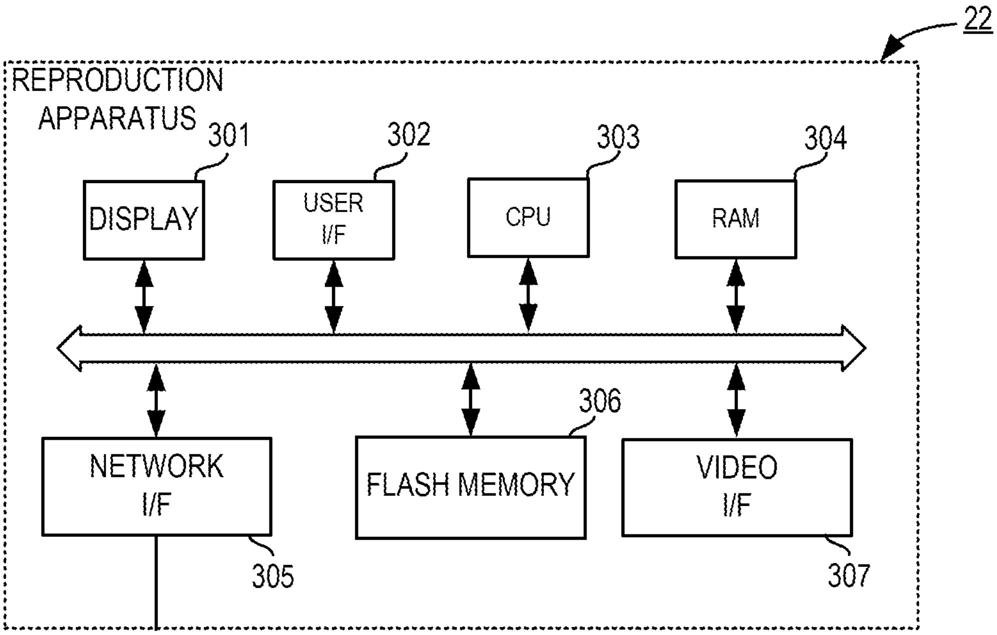
FIG. 7 is a block diagram showing a configuration of a reproduction apparatus 22.
Figure 8:
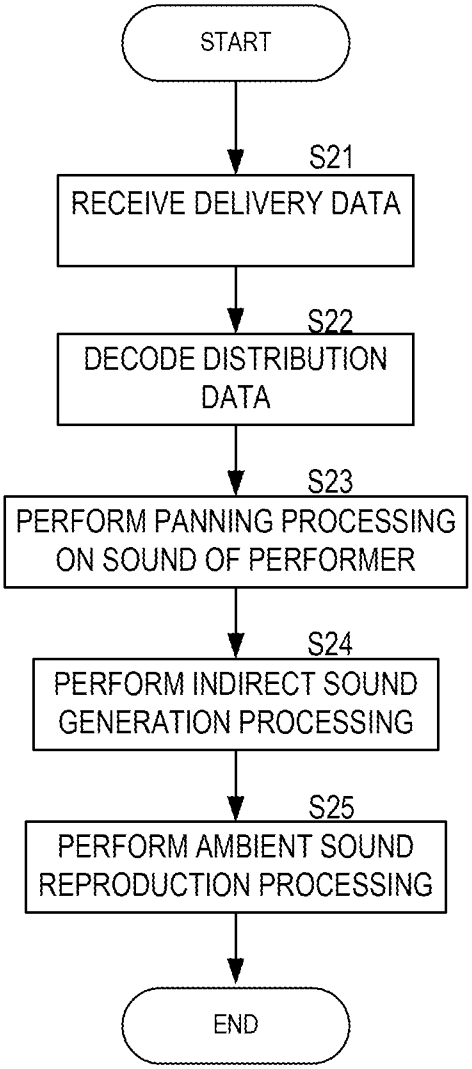
FIG. 8 is a flow chart showing an operation of the reproduction apparatus 22.

FIG. 7 is a block diagram showing a configuration of the reproduction apparatus 22. FIG. 8 is a flow chart showing an operation of the reproduction apparatus 22.

The reproduction apparatus 22 includes an information processing apparatus such as a general personal computer. The reproduction apparatus 22 includes a display 301, a user I/F 302, a CPU 303, a RAM 304, a network I/F 305, a flash memory 306, and a video I/F 307.

The CPU 303 reads out a program stored in the flash memory 306 being a storage medium to the RAM 304 and implements a predetermined function. It is to be noted that the program that the CPU 303 reads out does not also need to be stored in the flash memory 306 in the own apparatus. For example, the program may be stored in a storage medium of an external apparatus such as a server. In such a case, the CPU 303 may read out the program each time from the server to the RAM 304 and may execute the program.

The CPU 303 receives the distribution data from the distribution apparatus 12 through the network I/F 305 (S21). The CPU 303 decodes the distribution data into information on a sound source, information on space reverberation, ambience information, a video signal, and the like (S22), and renders the information on a sound source, the information on space reverberation, the ambience information, the video signal, and the like.

The CPU 303, as an example of rendering of the information on a sound source, causes the mixer 21 to perform panning processing on a sound of a performer (S23). The panning processing is processing to localize the sound of the performer at the position of the performer, as described above. The CPU 303 determines the volume of an audio signal to be distributed to the speakers 24A to 24F so that the sound of the performer may be localized at a position shown in the position information included in the information on a sound source. The CPU 303, by outputting information that shows an audio signal according to the sound of the performer and an output amount of the audio signal according to the sound of the performer to the speakers 24A to 24F, to the mixer 21, causes the mixer 21 to perform the panning processing.

As a result, the listener in the second venue 20 can perceive a sound as if the sound is emitted from the position of the performer. The listener in the second venue 20 can listen to a sound of the performer present on the right side of the stage of the first venue 10, for example, from the front right side in the second venue 20 as well. In addition, the CPU 303 may render the video signal and may display a live video on the display 23 through the video I/F 307. Accordingly, the listener in the second venue 20 listens to the sound of the performer on which the panning processing has been performed, while watching a video of the performer displayed on the display 23. As a result, the listener in the second venue 20, since visual information and auditory information match with each other, is able to obtain more sense of immersion to a live performance.

Furthermore, the CPU 303, as an example of rendering of the information on space reverberation, causes the mixer 21 to perform indirect sound generation processing (S24). The indirect sound generation processing includes the early reflected sound generation processing and the late reverberant sound generation processing. An early reflected sound is generated based on a sound of a performer included in the information on a sound source, and information that shows the size, shape, wall surface material quality, and the like of the space of the first venue 10 included in the information on space reverberation. The CPU 303 determines an arrival timing of the early reflected sound, based on the size and shape of a space, and determines a level of the early reflected sound, based on the material quality of a wall surface. More specifically, the CPU 303 determines coordinates of the wall surface by which the sound of a sound source is reflected, based on information on the size and shape of the space. Then, the CPU 303, based on a position of the sound source, a position of the wall surface, and a position of a sound receiving point, determines a position of a virtual sound source (an imaginary sound source) that exists with the wall surface as a mirror surface with respect to the position of the sound source. The CPU 303 determines a delay amount of the imaginary sound source, based on a distance from the position of the imaginary sound source to the sound receiving point. In addition, the CPU 303 determines a level of the imaginary sound source, based on the information on the material quality of the wall surface. The information on the material quality corresponds to energy loss at the time of reflection on the wall surface. Therefore, the CPU 303 determines the level of the imaginary sound source in consideration of the energy loss of the audio signal of the sound source. The CPU 303, by repeating such processing, is able to determine a delay amount and level of a sound according to the space reverberation, by calculation. The CPU 303 outputs the calculated delay amount and level to the mixer 21. The mixer 21 convolves a level tap coefficient according to these delay amount and level into the sound of a performer. As a result, the mixer 21 reproduces the space reverberation of the first venue 10, in the second venue 20. In addition, in a case in which the information on space reverberation includes an impulse response of the early reflected sound, the CPU 303 causes the mixer 11 to execute processing to convolve the impulse response into the sound of a performer by the FIR filter. The CPU 303 outputs the information on space reverberation (the impulse response) included in the distribution data to the mixer 21. The mixer 21 convolves the information on space reverberation (the impulse response) received from the reproduction apparatus 22 into the sound of a performer. Accordingly, the mixer 21 reproduces the space reverberation of the first venue 10, in the second venue 20.

Furthermore, in a case in which the information on space reverberation varies according to a position of a performer, the reproduction apparatus 22 outputs the information on space reverberation corresponding to the position of a performer, to the mixer 21, based on the position information included in the information on a sound source. For example, when the performer present at the front of the stage of the first venue 10 moves to the left of the stage, the impulse response to be convolved into the sound of a performer is changed from the first impulse response to the second impulse response. Alternatively, in a case in which the imaginary sound source is reproduced based on the information on the size and shape of the space, the delay amount and the level are recalculated according to the position of a performer after movement. As a result, appropriate space reverberation according to the position of a performer is also reproduced in the second venue 20.

In addition, the reproduction apparatus 22 may cause the mixer 21 to generate a space reverberation sound corresponding to an ambient sound, based on the ambience information and the information on space reverberation. In other words, a sound according to the space reverberation may include a first reverberation sound corresponding to a sound (a sound of a first sound source) of a performer and a second reverberation sound corresponding to an ambient sound (a sound of a second sound source). As a result, the mixer 21 reproduces the reverberation of an ambient sound in the first venue 10, in the second venue 20. In addition, in a case in which the ambience information includes position information, the reproduction apparatus 22 may output the information on space reverberation corresponding to the position of the ambient sound to the mixer 11, based on the position information included in the ambience information. The mixer 21 reproduces a reverberation sound of the ambient sound, based on the position of the ambient sound. For example, in a case in which a spectator present at the left rear of the first venue 10 moves to the right rear, the impulse response to be convolved into a shout of the spectator is changed. Alternatively, in a case in which the imaginary sound source is reproduced based on the information on the size and shape of the space, the delay amount and the level are recalculated according to the position of a spectator after movement. In this manner, the information on space reverberation includes first reverberation information that varies according to the position of the sound (the first sound source) of a performer, and second reverberation information that varies according to the position of an ambient sound (the second sound source), the rendering may include processing to generate the first reverberation sound based on the first reverberation information, and processing to generate the second reverberation sound based on the second reverberation information.

In addition, the late reverberant sound is a reflected sound of which the arrival direction of a sound is not fixed. The late reverberant sound is less affected by a variation in the position of the sound than the early reflected sound. Therefore, the reproduction apparatus 22 changes only the impulse response of the early reflected sound that varies according to the position of a performer, and may fix the impulse response of the late reverberant sound.

It is to be noted that the reproduction apparatus 22 may omit the indirect sound generation processing, and may use the reverberation of the second venue 20 as it is. In addition, the indirect sound generation processing may include only the early reflected sound generation processing. The late reverberant sound may use the reverberation of the second venue 20 as it is. Alternatively, the mixer 21 may reinforce the control of the second venue 20 by further feeding back the sound obtained by a not-shown microphone installed near the ceiling or wall surface of the second venue 20, to the speaker 24A to the speaker 24F.

The CPU 303 of the reproduction apparatus 22 performs ambient sound reproduction processing, based on the ambience information (S25). The ambience information includes an audio signal of a sound such as background noise, and a cheer, applause, calling, shout, chorus, or murmur of a listener. The CPU 303 outputs these audio signals to the mixer 21. The mixer 21 outputs the audio signals received from the reproduction apparatus 22, to the speakers 24A to 24F.

The CPU 303, in a case in which the ambience information includes the position information of an ambient sound, causes the mixer 21 to perform processing to localize the ambient sound by panning processing. In such a case, the CPU 303 determines the volume of an audio signal to be distributed to the speakers 24A to 24F so that the ambient sound may be localized at a position of the position information included in the ambience information. The CPU 303, by outputting information that shows an audio signal of the ambient sound and an output amount of the audio signal according to the ambient sound to the speakers 24A to 24F, to the mixer 21, causes the mixer 21 to perform the panning processing. In addition, the same applies to a case in which the position information of the ambient sound is position information of each microphone 13D to 13F. The CPU 303 determines the volume of the audio signal to be distributed to the speakers 24A to 24F so that the ambient sound may be localized at the position of the microphone. Each microphone 13D to 13F collects a plurality of ambient sounds (the second sound source) such as background noise, applause, choruses, or shouts such as "wow," and murmurs. The sound of each sound source includes a predetermined delay amount and level and reaches the microphone. In other words, the background noise, applause, choruses, or shouts such as "wow," murmurs, and the like also reach the microphone as individual sound sources including a predetermined delay amount and level (information for localizing a sound source). The CPU 303 can also simply reproduce individual sound source localization by performing panning processing so that a sound collected by a microphone may be localized at the position of the microphone.

It is to be noted that the CPU 303 may perform processing to perceive spatial expansion by causing the mixer 21 to perform effect processing such as reverb, on a sound unrecognized as a voice of an individual listener or sounds simultaneously emitted by a large number of listeners. For example, the background noise, applause, choruses, or shouts such as "wow," murmurs, and the like are sounds that reverberate throughout a live venue. The CPU 303 causes the mixer 21 to perform effect processing to perceive spatial expansion, on these sounds.

The reproduction apparatus 22 may provide the ambient sound based on the above ambience information, to the second venue 20. As a result, the listener in the second venue 20 can watch a live performance with more realistic sensation, as if watching the live performance in the first venue 10.

As described above, the live data distribution system 1 according to the present embodiment distributes the information on a sound source according to a sound generated in the first venue 10, and the information on space reverberation, as distribution data, and renders the distribution data and provides a sound according to the information on a sound source and a sound according to the space reverberation, to the second venue 20. As a result, the realistic sensation in the live venue is able to be provided to a venue being a distribution destination.

In addition, the live data distribution system 1 distributes first information on a sound source according to a sound (a sound of a performer, for example) of a first sound source generated at a first place (a stage, for example) of the first venue 10 and position information of the first sound source, and second information on a sound source according to a second sound source (an ambient sound, for example) generated at a second place (a place at which a listener is present, for example) of the first venue 10, as distribution data, and renders the distribution data and provides a sound of the first sound source on which localization processing based on the position information of the first sound source has been performed and a sound of the second sound source, to the second venue. As a result, the realistic sensation in the live venue is able to be provided to a venue being a distribution destination.

Figure 9:
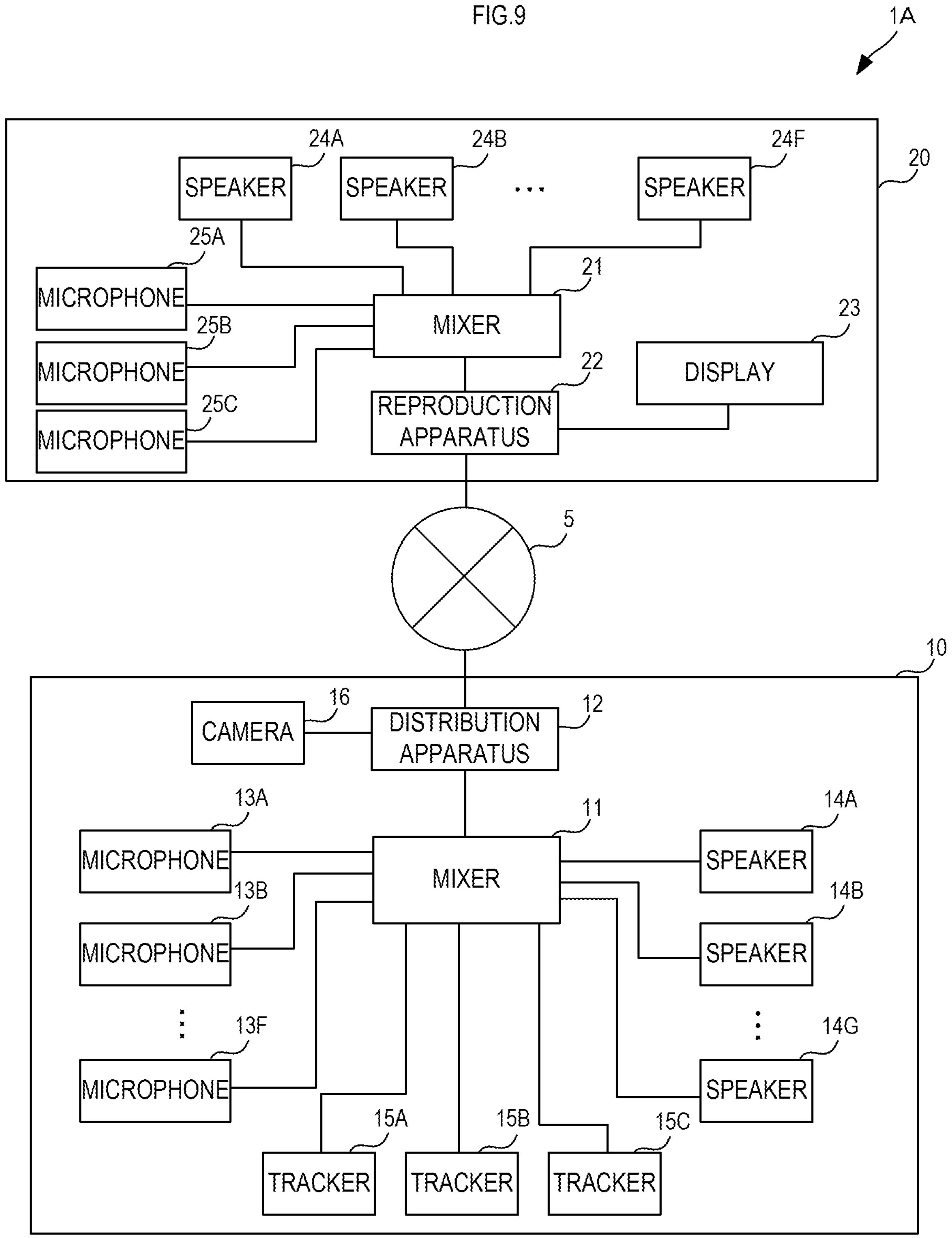
FIG. 9 is a block diagram showing a configuration of a live data distribution system 1A according to a first modification.
Figure 10:
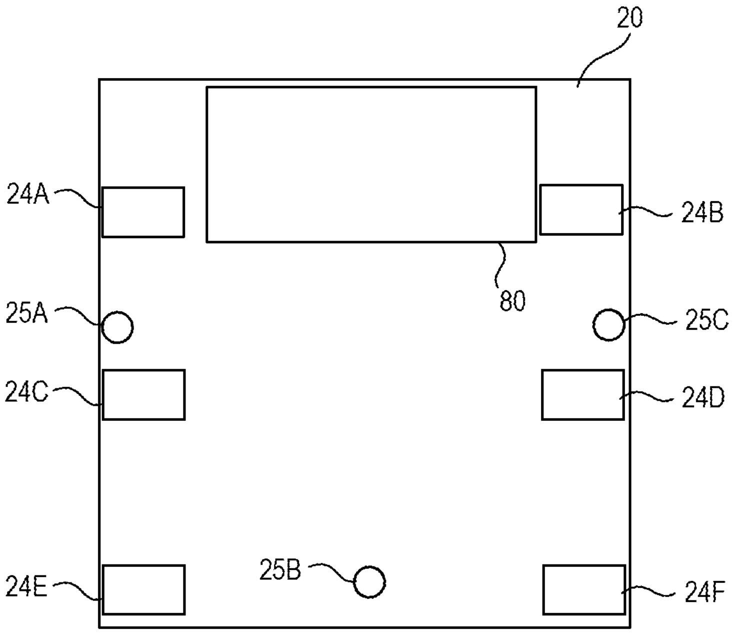
FIG. 10 is a plan schematic diagram of a second venue 20 in the live data distribution system 1A according to the first modification.

Next, FIG. 9 is a block diagram showing a configuration of a live data distribution system 1A according to a first modification. FIG. 10 is a plan schematic diagram of a second venue 20 in the live data distribution system 1A according to the first modification. The same reference numerals are used to refer to components common to FIG. 1 and FIG. 3, and the description will be omitted.

A plurality of microphones 25A to 25C are installed in the second venue 20 of the live data distribution system 1A. The microphone 25A is installed on the left side of the center of the front and rear to a stage 80 of the second venue 20, and the microphone 25B is installed in the rear center of the second venue 20. The microphone 25C is installed on the right side of the center of the front and rear of the second venue 20.

The microphones 25A to 25C obtain an ambient sound of the second venue 20. The mixer 21 outputs an audio signal of the ambient sound, to the reproduction apparatus 22, as ambience information. It is to be noted that, the ambience information may include position information of the ambient sound. The position information of the ambient sound, as described above, is able to be determined from the sound obtained by the microphones 25A to 25C, for example.

The reproduction apparatus 22 sends the ambience information according to the ambient sound generated at the second venue 20 as a third sound source, to a different venue. For example, the reproduction apparatus 22 feeds back the ambient sound generated at the second venue 20, to the first venue 10. As a result, a performer on the stage of the first venue 10 can hear a voice, applause, a shout, or the like other than the listener in the first venue 10, and can perform a live performance under an environment full of realistic sensation. In addition, the listener present in the first venue 10 can also hear the voice, the applause, the shout, or the like of the listener in the different venue, and can watch the live performance under the environment full of realistic sensation.

Furthermore, when the reproduction apparatus in the different venue renders distribution data, provides the sound of the first venue to the different venue, and provides an ambient sound generated in the second venue 20 to the different venue, the listener in the different venue can also hear the voice, the applause, the shout, or the like of a large number of listeners, and can watch the live performance under the environment full of realistic sensation.

Figure 11:
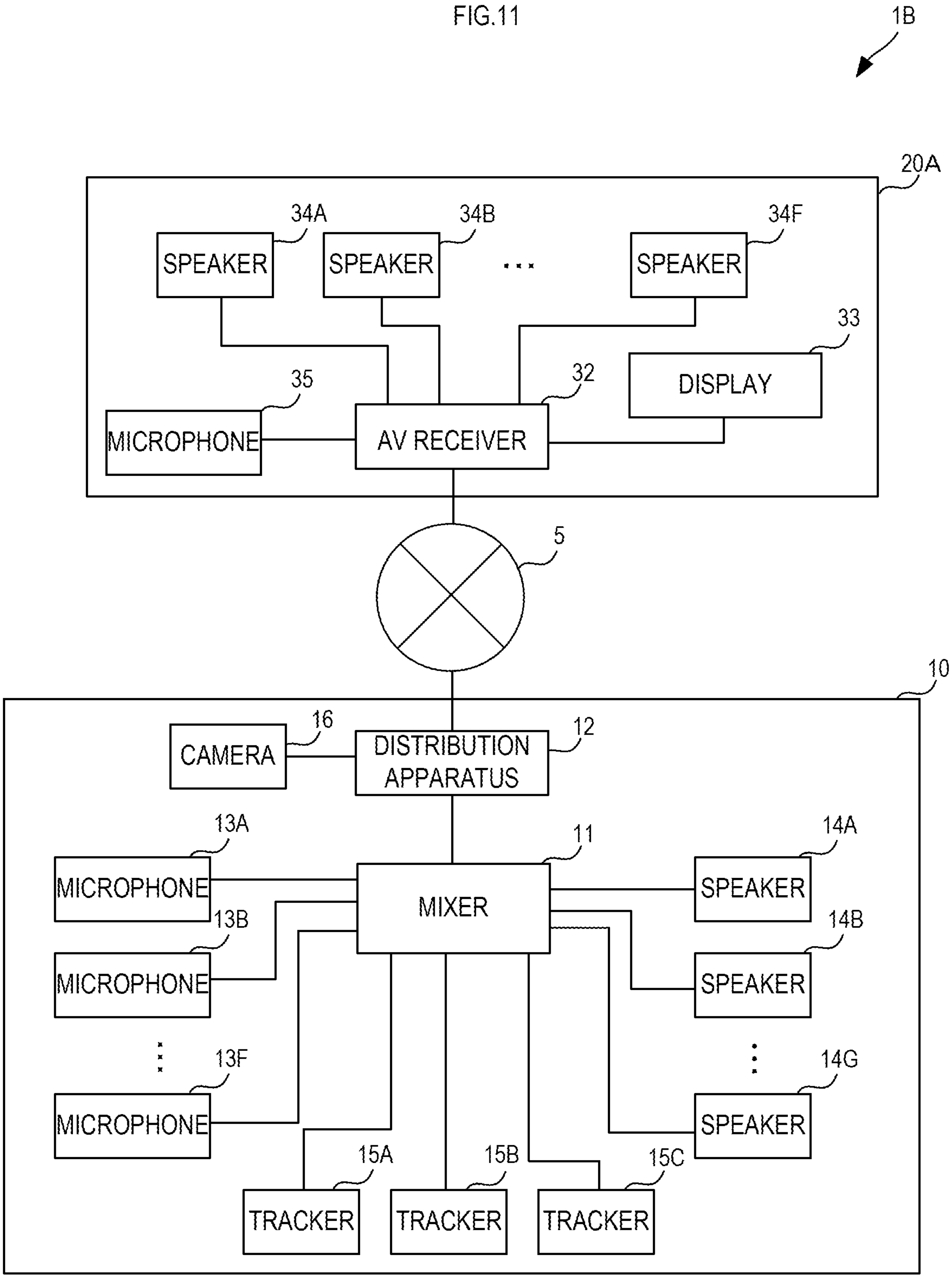
FIG. 11 is a block diagram showing a configuration of a live data distribution system 1B according to a second modification.

Next, FIG. 11 is a block diagram showing a configuration of a live data distribution system 1B according to a second modification. The same reference numerals are used to refer to components common to FIG. 1, and the description will be omitted.

In the live data distribution system 1B, the distribution apparatus 12 is connected to an AV receiver 32 in a third venue 20A through the Internet 5. The AV receiver 32 is connected to a display 33, a plurality of speakers 34A to 34F, and a microphone 35. The third venue 20A is a private house of a certain listener, for example. The AV receiver 32 is an example of a reproduction apparatus. A user of the AV receiver 32 is a listener remotely watching a live performance in the first venue 10.

Figure 12:
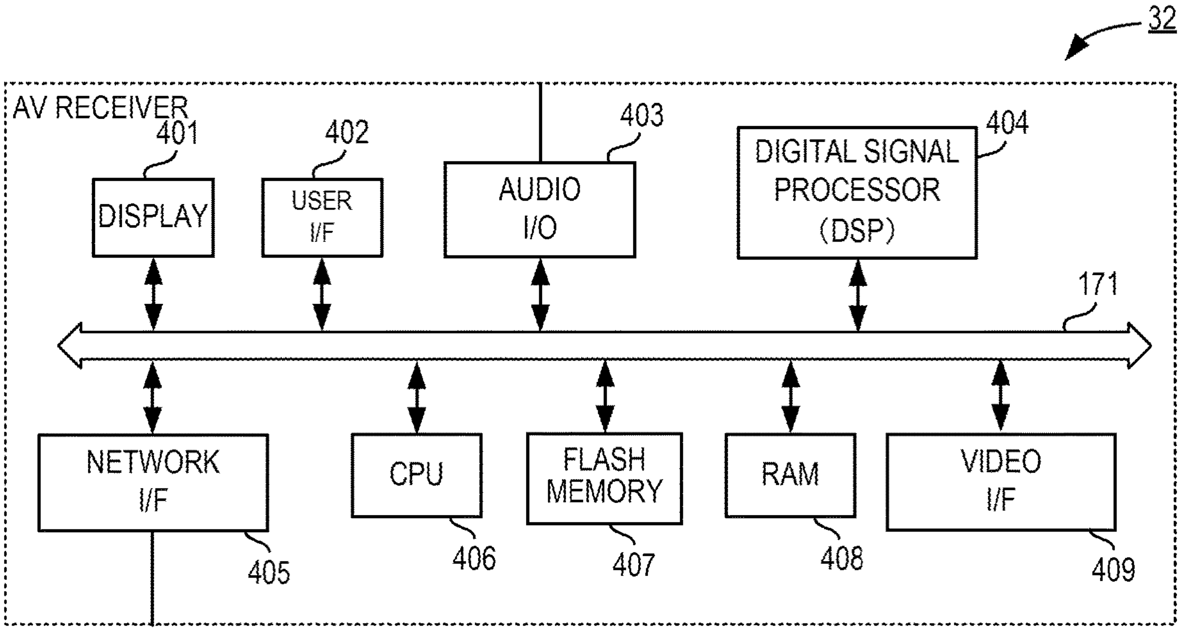
FIG. 12 is a block diagram showing a configuration of an AV receiver 32.

FIG. 12 is a block diagram showing a configuration of the AV receiver 32. The AV receiver 32 includes a display 401, a user I/F 402, an audio I/O (Input/Output) 403, a digital signal processor (DSP) 404, a network I/F 405, a CPU 406, a flash memory 407, a RAM 408, and a video I/F 409.

The CPU 406 is a controller that controls an operation of the AV receiver 32. The CPU 406 reads and executes a predetermined program stored in the flash memory 407 being a storage medium to the RAM 408 and performs various types of operations.

It is to be noted that the program that the CPU 406 reads also has no need to be stored in the flash memory 407 in the own apparatus. For example, the program may be stored in a storage medium of an external apparatus such as a server. In such a case, the CPU 406 may read out the program each time from the server to the RAM 408 and may execute the program.

The digital signal processor 404 includes a DSP for performing various types of signal processing. The digital signal processor 404 performs signal processing on an audio signal inputted through the audio I/O 403 or the network I/F 405. The digital signal processor 404 outputs the audio signal on which the signal processing has been performed, to an acoustic device such as a speaker, through the audio I/O 403 or the network I/F 405.

The AV receiver 32 performs the same processing as the processing performed by the mixer 21 and the reproduction apparatus 22. The CPU 406 receives the distribution data from the distribution apparatus 12 through the network I/F 405. The CPU 406 renders the distribution data and provides a sound according to the sound of a performer and the space reverberation, to the third venue 20A. Alternatively, the CPU 406 renders the distribution data and provides the ambient sound generated in the first venue 10, to the third venue 20A.

Alternatively, the CPU 406 may render the distribution data and may display a live video on the display 33 through the video I/F 307.

The digital signal processor 404 performs panning processing on the sound of a performer. In addition, the digital signal processor 404 performs indirect sound generation processing. Alternatively, the digital signal processor 404 may perform panning processing on an ambient sound.

As a result, the AV receiver 32 is able to provide the realistic sensation of the first venue 10 to the third venue 20A as well.

In addition, the AV receiver 32 obtains an ambient sound (a sound such as a cheer, applause, or calling of a listener) in the third venue 20A, through the microphone 35. The AV receiver 32 sends the ambient sound in the third venue 20A to another apparatus. For example, the AV receiver 32 feeds back the ambient sound in the third venue 20A, to the first venue 10.

In such a manner, when the sound from a plurality of listeners is fed back to the first venue 10, a performer on the stage of the first venue 10 can hear a cheer, applause, a shout, or the like of the large number of listeners other than the listener in the first venue 10, and can perform a live performance under an environment full of realistic sensation. In addition, the listener present in the first venue 10 can also hear the cheer, the applause, the shout, or the like of the large number of listeners in a remote place, and can watch the live performance under the environment full of realistic sensation.

Alternatively, the AV receiver 32 displays icon images including a "cheer," "applause," "calling," and a "murmur," on the display 401, and, by receiving an operation to select these icon images from listeners through the user I/F 402, may receive reactions of the listeners. The AV receiver 32, when receiving an operation to select these reactions, may generate an audio signal corresponding to each reaction and may send the audio signal as ambience information to another apparatus.

Alternatively, the AV receiver 32 may send information that shows the type of the ambient sound such as the cheer, the applause, or the calling of the listeners, as ambience information. In such a case, an apparatus (the distribution apparatus 12 and the mixer 11, for example) on a receiving side generates a corresponding audio signal, based on the ambience information, and provides the sound such as the cheer, the applause, or the calling of the listeners, to the inside of a venue. In such a manner, the ambience information may be information that shows not the audio signal of an ambient sound, but a sound to be generated, and may be processing in which the distribution apparatus 12 and the mixer 11 reproduce a pre-recorded ambient sound or the like.

In addition, the ambience information of the first venue 10 may also be a pre-recorded ambient sound, rather than the ambient sound generated in the first venue 10. In such a case, the distribution apparatus 12 distributes information that shows a sound to be generated, as ambience information. The reproduction apparatus 22 or the AV receiver 32 reproduces a corresponding ambient sound, based on the ambience information. In addition, among the ambience information, a background noise, a murmur, and the like may be a recorded sound, and another ambient sound (such as a cheer, applause, or calling of a listener, for example) may be a sound generated in the first venue 10.

In addition, the AV receiver 32 may receive position information of a listener through the user I/F 402. The AV receiver 32 displays an image that imitates a plan view, a perspective view, or a similar view of the first venue 10 on the display 401 or the display 33, and receives the position information from a listener through the user I/F 402 (see FIG. 16, for example). The position information is information to designate any position in the first venue 10. The AV receiver 32 sends received position information of the listener, to the first venue 10. The distribution apparatus 12 and the mixer 11 in the first venue perform processing to localize the ambient sound of the third venue 20A at a designated position, based on the ambient sound in the third venue 20A and the position information of a listener that have been received from the AV receiver 32.

In addition, the AV receiver 32 may change the content of the panning processing, based on the position information received from the user. For example, when a listener designates a position immediately in front of the stage of the first venue 10, the AV receiver 32 sets a localization position of the sound of a performer to the position immediately in front of the listener and performs the panning processing. As a result, the listener in the third venue 20A can obtain realistic sensation, as if being present immediately in front of the stage of the first venue 10.

The sound of the listener in the third venue 20A may send to the second venue 20 instead of the first venue 10, and may also send to a different venue. For example, the sound of the listener in the third venue 20A may be sent only to a house (a fourth venue) of a friend. A listener in the fourth venue can watch the live performance of the first venue 10, while listening to the sound of the listener in the third venue 20A. In addition, a not-shown reproduction apparatus in the fourth venue may send the sound of the listener in the fourth venue to the third venue 20A. In such a case, the listener in the third venue 20A can watch the live performance of the first venue 10, while listening to the sound of the listener in the fourth venue. As a result, the listener in the third venue 20A and the listener in the fourth venue can watch the live performance of the first venue 10, while talking to each other.

Figure 13:
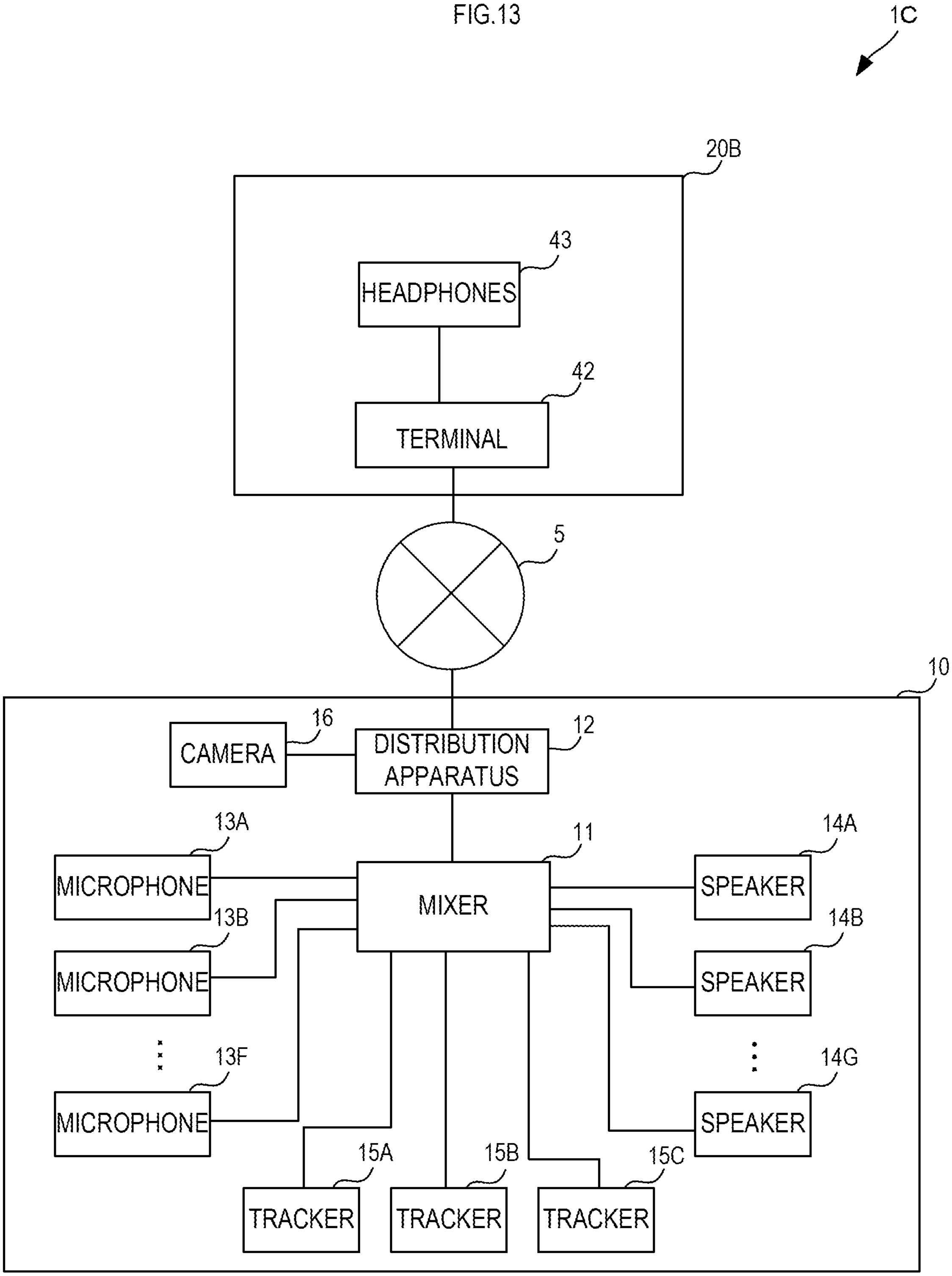
FIG. 13 is a block diagram showing a configuration of a live data distribution system 1C according to a third modification.

FIG. 13 is a block diagram showing a configuration of a live data distribution system 1C according to a third modification. The same reference numerals are used to refer to components common to FIG. 1, and the description will be omitted.

In the live data distribution system 1C, the distribution apparatus 12 is connected to a terminal 42 in a fifth venue 20B through the Internet 5. The terminal 42 is connected to headphones 43. The fifth venue 20B is a private house of a certain listener, for example. However, in a case in which the terminal 42 is portable, the fifth venue 20B may be any place such as inside of a cafe shop, inside of a car, or inside of public transportation. In such a case, everywhere can be the fifth venue 20B. The terminal 42 is an example of a reproduction apparatus. A user of the terminal 42 may be a listener remotely watching the live performance of the first venue 10. In this case as well, the terminal 42 renders distribution data and provides a sound according to information on a sound source through the headphones 43 and a sound according to space reverberation, to the second venue (the fifth venue 20B in this example).

Figure 14:
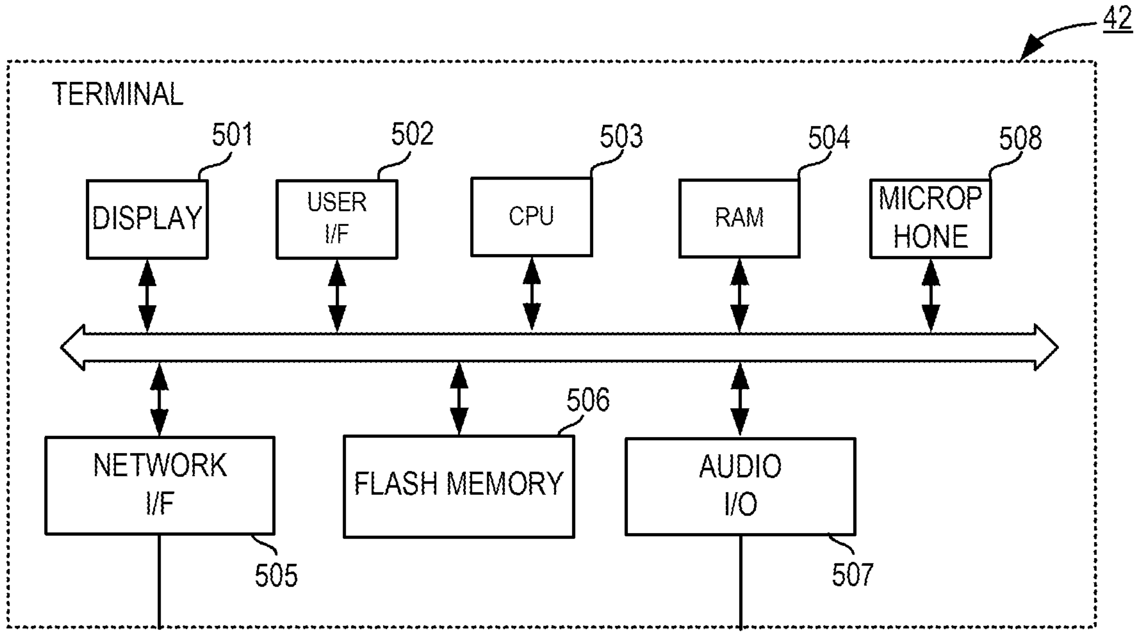
FIG. 14 is a block diagram showing a configuration of a terminal 42.

FIG. 14 is a block diagram showing a configuration of the terminal 42. The terminal 42 may be an information processing apparatus such as a personal computer, a smartphone, or a tablet computer, for example. The terminal 42 includes a display 501, a user I/F 502, a CPU 503, a RAM 504, a network I/F 505, a flash memory 506, an audio I/O (Input/Output) 507, and a microphone 508.

The CPU 503 is a controller that controls the operation of the terminal 42. The CPU 503 reads and executes a predetermined program stored in the flash memory 506 being a storage medium to the RAM 504 and performs various types of operations.

It is to be noted that the program that the CPU 503 reads also has no need to be stored in the flash memory 506 in the own apparatus. For example, the program may be stored in a storage medium of an external apparatus such as a server. In such a case, the CPU 503 may read the program each time from the server to the RAM 504 and may execute the program.

The CPU 503 performs signal processing on an audio signal inputted through the network I/F 505. The CPU 503 outputs the audio signal on which the signal processing has been performed, to the headphones 43 through the audio I/O 507.

The CPU 503 receives the distribution data from the distribution apparatus 12 through the network I/F 505. The CPU 503 renders the distribution data and provides a sound of a performer and a sound according to space reverberation, to the listeners in the fifth venue 20B.

Specifically, the CPU 503 convolves a head-related transfer function (hereinafter referred to as HRTF) into an audio signal according to the sound of a performer, and performs acoustic image localization processing (binaural processing) so that the sound of a performer may be localized at the position of the performer. The HRTF corresponds to a transfer function between a predetermined position and an ear of a listener. The HRTF corresponds to a transfer function expressing the loudness, the reaching time, the frequency characteristics, and the like of a sound emitted from a sound source in a certain position to each of left and right ears. The CPU 503 convolves the HRTF into the audio signal of the sound of the performer, based on the position of the performer. As a result, the sound of the performer is localized at a position according to position information.

In addition, the CPU 503 performs indirect sound generation processing on the audio signal of the sound of the performer by binaural processing to convolve the HRTF corresponding to information on space reverberation. The CPU 503 localizes an early reflected sound and a late reverberant sound by convolving the HRTF from a position of a virtual sound source corresponding to each early reflected sound included in the information on space reverberation to each of the left and right ears. However, the late reverberant sound is a reflected sound of which the arrival direction of a sound is not fixed. Therefore, the CPU 503 may perform effect processing such as reverb, without performing the localization processing, on the late reverberant sound. It is to be noted that the CPU 503 may perform digital filter processing (headphone inverse characteristic processing) to reproduce the inverse characteristics of the acoustic characteristics of the headphones 43 that a listener uses.

In addition, the CPU 503 renders ambience information among the distribution data and provides an ambient sound generated in the first venue 10, to the listener in the fifth venue 20B. The CPU 503, in a case in which position information of the ambient sound is included in the ambience information, performs the localization processing by the HRTF and performs the effect processing on a sound of which the arrival direction is not fixed.

In addition, the CPU 503 may render a video signal among the distribution data and may display a live video on the display 501.

As a result, the terminal 42 is also able to provide the realistic sensation of the first venue 10 to the listener in the fifth venue 20B.

In addition, the terminal 42 obtains the sound of the listener in the fifth venue 20B through the microphone 508. The terminal 42 sends the sound of the listener to another apparatus. For example, the terminal 42 feeds back the sound of the listener to the first venue 10. Alternatively, the terminal 42 displays icon images including a "cheer, ""applause," "calling," and a "murmur," on the display 501, and, by receiving an operation to select these icon images from listeners through the user I/F 502, may receive reactions of the listeners. The terminal 42 generates a sound corresponding to received reactions, and sends a generated sound as ambience information to another apparatus. Alternatively, the terminal 42 may send information that shows the type of the ambient sound such as the cheer, the applause, or the calling of the listeners, as ambience information. In such a case, an apparatus (the distribution apparatus 12 and the mixer 11, for example) on a receiving side generates a corresponding audio signal, based on the ambience information, and provides the sound such as the cheer, the applause, or the calling of the listeners, to the inside of a venue.

In addition, the terminal 42 may also receive position information of a listener through the user I/F 502. The terminal 42 sends received position information of a listener, to the first venue 10. The distribution apparatus 12 and the mixer 11 in the first venue perform processing to localize the sound of the listener at a designated position, based on the sound of the listener in the third venue 20A and the position information that have been received from the AV receiver 32.

In addition, the terminal 42 may change the HRTF, based on the position information received from the user. For example, when a listener designates a position immediately in front of the stage of the first venue 10, the terminal 42 sets a localization position of the sound of a performer to the position immediately in front of the listener and convolves the HRTF such that the sound of a performer may be localized at the position. As a result, the listener in the fifth venue 20B can obtain realistic sensation, as if being present immediately in front of the stage of the first venue 10.

The sound of the listener in the fifth venue 20B may be sent to the second venue 20 instead of the first venue 10, and may further be sent to a different venue. In the same manner as described above, the sound of the listener in the fifth venue 20B may be sent only to the house (the fourth venue) of a friend. As a result, the listener in the fifth venue 20B and the listener in the fourth venue can watch the live performance of the first venue 10, while talking to each other.

In addition, in the live data distribution system according to the present embodiment, a plurality of users can designate the same position. For example, each of the plurality of users may designate a position immediately in front of the stage of the first venue 10. In such a case, each listener can obtain realistic sensation, as if being present immediately in front of the stage. As a result, a plurality of listeners can watch a performance of a performer, with the same realistic sensation, with respect to one position (a seat in the venue). In such a case, a live operator can provide service to audience beyond capacity of a real space.

Figure 15:
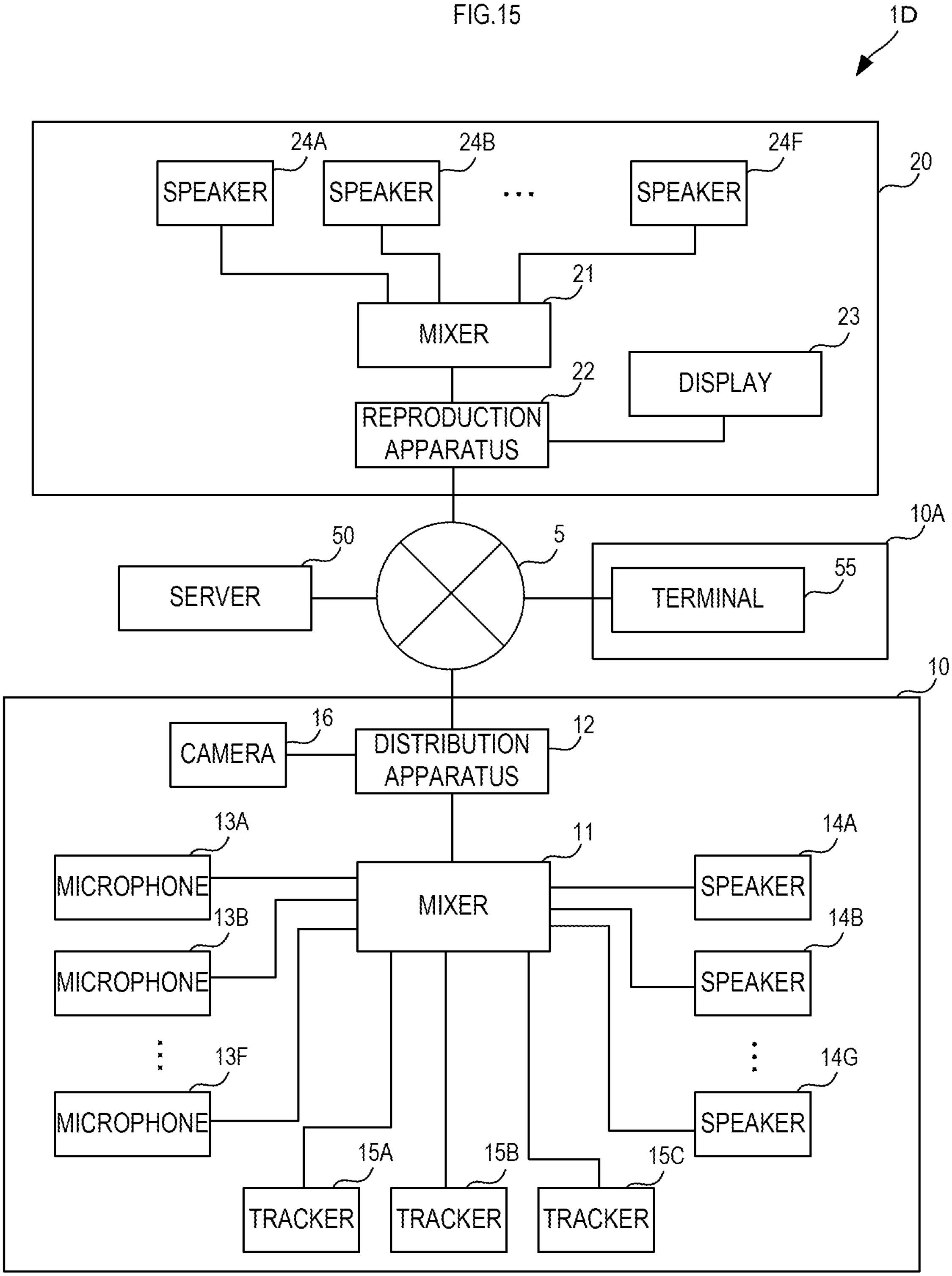
FIG. 15 is a block diagram showing a configuration of a live data distribution system 1D according to a fourth modification.

FIG. 15 is a block diagram showing a configuration of a live data distribution system 1D according to a fourth modification. The same reference numerals are used to refer to components common to FIG. 1, and the description will be omitted.

The live data distribution system 1D further includes a server 50 and a terminal 55. The terminal 55 is installed in a sixth venue 10A. The server 50 is an example of the distribution apparatus, and a hardware configuration of the server 50 is the same as the hardware configuration of the distribution apparatus 12. A hardware configuration of the terminal 55 is the same as the configuration of the terminal 42 shown in FIG. 14.

The sixth venue 10A is a house of a performer remotely performing a performance such as playing. The performer present in the sixth venue 10A performs a performance such as playing or singing, according to playing or singing in the first venue. The terminal 55 sends the sound of the performer in the sixth venue 10A to the server 50. In addition, the terminal 55, by a not-shown camera, may capture the performer in the sixth venue 10A, and may send a video signal to the server 50.

The server 50 distributes distribution data including the sound of a performer in the first venue 10, the sound of a performer in the sixth venue 10A, the information on space reverberation of the first venue 10, the ambience information of the first venue 10, the live video of the first venue 10, and the video of the performer in the sixth venue 10A.

In such a case, the reproduction apparatus 22 renders the distribution data and provides the sound of the performer in the first venue 10, the sound of the performer in the sixth venue 10A, the space reverberation of the first venue 10, the ambient sound of the first venue 10, the live video of the first venue 10, and the video of the performer in the sixth venue 10A, to the second venue 20. For example, the reproduction apparatus 22 displays the video of the performer in the sixth venue 10A, the video being superimposed on the live video of the first venue 10.

The sound of the performer in the sixth venue 10A, although having no need to be performed by the localization processing, may be localized at a position matching with the video displayed on a display. For example, in a case in which the performer in the sixth venue 10A is displayed on the right side in the live video, the sound of the performer in the sixth venue 10A is localized on the right side.

In addition, the performer in the sixth venue 10A or a distributor of the distribution data may designate the position of the performer. In such a case, the distribution data includes position information of the performer in the sixth venue 10A. The reproduction apparatus 22 localizes the sound of the performer in the sixth venue 10A, based on the position information of the performer in the sixth venue 10A.

The video of the performer in the sixth venue 10A is not limited to the video captured by the camera. For example, a two-dimensional image or a character image (a virtual video) of 3D modeling may be distributed as a video of the performer in the sixth venue 10A.

It is to be noted that the distribution data may include audio recording data. In addition, the distribution data may also include video recording data. For example, the distribution apparatus may distribution data including the sound of the performer in the first venue 10, audio recording data, the information on space reverberation of the first venue 10, the ambience information of the first venue 10, the live video of the first venue 10, and video recording data. In such a case, the reproduction apparatus renders the distribution data and provides the sound of the performer in the first venue 10, the sound according to the audio recording data, the space reverberation of the first venue 10, the ambient sound of the first venue 10, the live video of the first venue 10, and the video according to the video recording data, to a different venue. The reproduction apparatus 22 displays the video of the performer corresponding to the video recording data, the video being superimposed on the live video of the first venue 10.

In addition, the distribution apparatus, when recording the sound according to the audio recording data, may determine the type of a musical instrument. In such a case, the distribution apparatus distributes the distribution data including information that shows the audio recording data and an identified type of the musical instrument. The reproduction apparatus generates a video of a corresponding musical instrument, based on the information that shows the type of the musical instrument. The reproduction apparatus may display a video of the musical instrument, the video being superimposed on the live video of the first venue 10.

In addition, the distribution data does not require superimposition of the video of the performer in the sixth venue 10A on the live video of the first venue 10. For example, the distribution data may distribute a video of a performer in each of the first venue 10 and the sixth venue 10A and a background video, as separate data. In such a case, the distribution data includes information that shows a display position of each video. The reproduction apparatus renders the video of each performer, based on the information that shows a display position.

In addition, the background video is not limited to a video of a venue such as the first venue 10 in which a live performance is being actually performed. The background video may be a video of a venue different from the venue in which a live performance is being performed.

Furthermore, the information on space reverberation included in the distribution data also has no need to correspond to the space reverberation of the first venue 10. For example, the information on space reverberation may be virtual space information (information that shows the size, shape, wall surface material quality, and the like of the space of each venue, or an impulse response that shows a transfer function of each venue) for virtually reproducing the space reverberation of a venue corresponding to the background video. The impulse response in each venue may be measured in advance or may be determined by simulation from the size, shape, wall surface material quality, and the like of the space of each venue.

Furthermore, the ambience information may also be changed to content according to the background video. For example, in a case in which the background video is for a large venue, the ambience information includes sounds such as cheers, applause, shouts, and the like of a large number of listeners. In addition, an outdoor venue includes background noise different from background noise of an indoor venue. Moreover, the reverberation of the ambient sound may also vary according to the information on space reverberation. In addition, the ambience information may include information that shows the number of spectators, and information that shows the degree of congestion (density of people). The reproduction apparatus increases or decreases the number of sounds such as cheers, applause, shouts, and the like of listeners, based on the information that shows the number of spectators. In addition, the reproduction apparatus increases or decreases the volume of cheers, applause, shouts, and the like of listeners, based on the information that shows the degree of congestion.

Alternatively, the ambience information may be changed according to a performer. For example, in a case in which a performer with a large number of female fans performs a live performance, the sounds such as cheers, calling, shouts, and the like of listeners that are included in the ambience information are changed to a female voice. The ambience information may include an audio signal of the voice of these listeners, and may also include information that shows an audience attribute such as a male-to-female ratio or an age ratio. The reproduction apparatus changes the voice quality of the cheers, applause, shouts, and the like of listeners, based on the information that shows the attribute.

In addition, listeners in each venue may designate a background video and information on space reverberation. The listeners in each venue use the user I/F of the reproduction apparatus and designate a background video and information on space reverberation.

Figure 16:
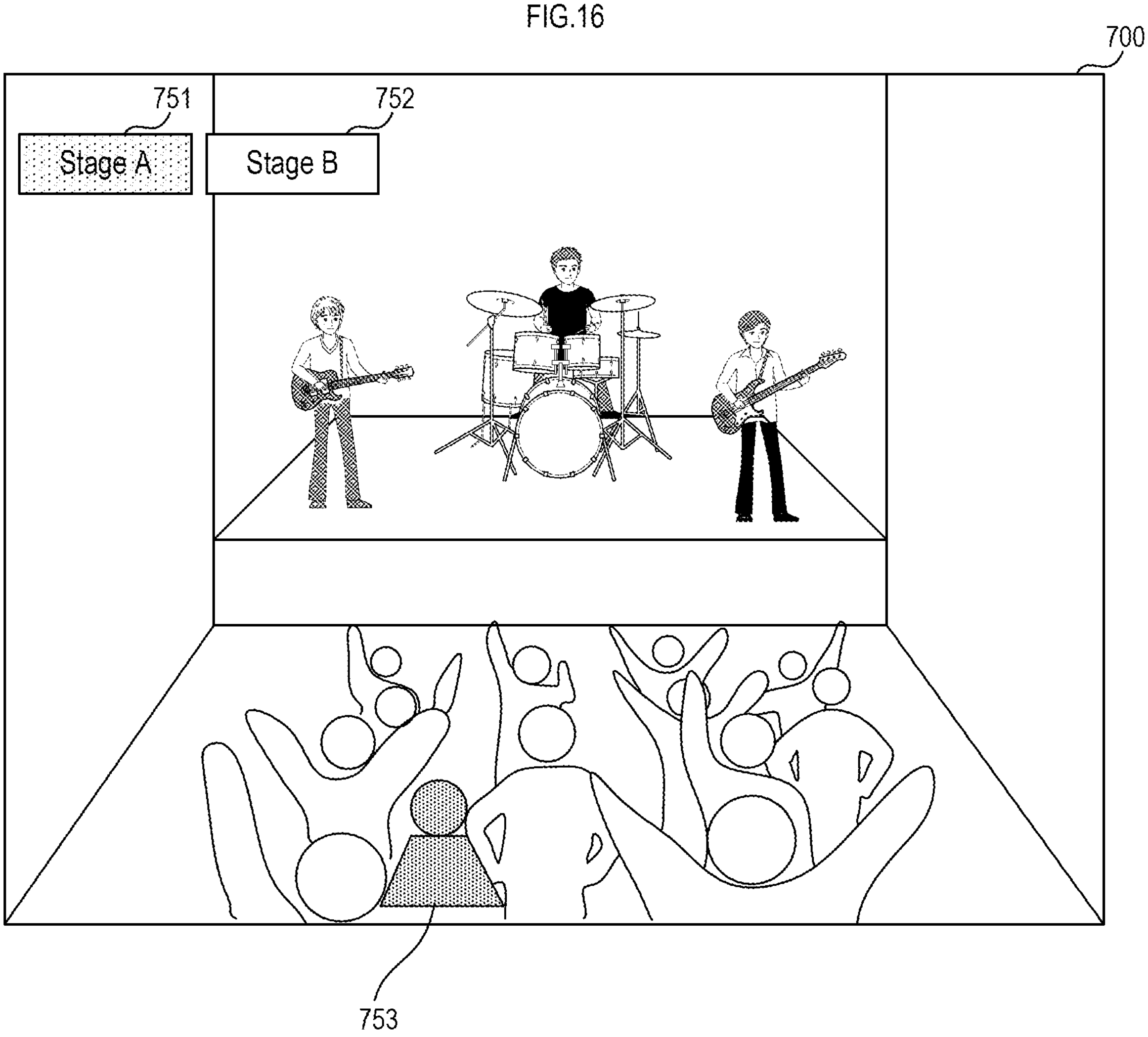
FIG. 16 is a view showing an example of a live video 700 displayed on a reproduction apparatus in each venue.

FIG. 16 is a view showing an example of a live video 700 displayed on the reproduction apparatus in each venue. The live video 700 includes a video captured at the first venue 10 or other venues, or a virtual video (computer graphics) corresponding to each venue. The live video 700 is displayed on the display of the reproduction apparatus. The live video 700 displays a video including a background of a venue, a stage, a performer including a musical instrument, and listeners in the venue. The video including the background of a venue, the stage, the performer including a musical instrument, and the listeners in the venue may all be actually captured or may be virtual. In addition, only the background video may be actually captured while other videos may be virtual. Moreover, the live video 700 displays an icon image 751 and icon image 752 for designating a space. The icon image 751 is an image for designating a space of Stage A (the first venue 10, for example) being a certain venue, and the icon image 752 is an image for designating a space of Stage B (a different concert hall, for example) being a different venue. Furthermore, the live video 700 displays a listener image 753 for designating a position of a listener.

A listener using the reproduction apparatus uses the user I/F of the reproduction apparatus and designates a desired space by designating either the icon image 751 or the icon image 752. The distribution apparatus distributes the distribution data including a background video and information on space reverberation corresponding to a designated space. Alternatively, the distribution apparatus may distribute the distribution data including a plurality of background videos and a plurality of pieces of information on space reverberation. In such a case, the reproduction apparatus renders the background video and information on space reverberation corresponding to the space designated by the listener, among received distribution data.

In the example of FIG. 16, the icon image 751 is designated. The reproduction apparatus displays the background video (the video of the first venue 10, for example) corresponding to Stage A of the icon image 751, and reproduces a sound according to space reverberation corresponding to designated Stage A. When the listener designates the icon image 752, the reproduction apparatus switches and displays the background video of Stage B being a different space corresponding to the icon image 752, and reproduces a sound according to corresponding different space reverberation, based on virtual space information corresponding to Stage B.

As a result, the listener of each reproduction apparatus can obtain realistic sensation, as if being watching a live performance in a desired space.

In addition, the listener of each reproduction apparatus can designate a desired position in a venue by moving the listener image 753 in the live video 700. The reproduction apparatus performs localization processing based on the position designated by a user. For example, when the listener moves the listener image 753 to a position immediately in front of a stage, the reproduction apparatus sets a localization position of the sound of a performer to the position immediately in front of the listener, and performs the localization processing so as to localize the sound of a performer at the position. As a result, the listener of each reproduction apparatus can obtain realistic sensation, as if being present immediately in front of the stage.

In addition, as described above, when the position of a sound source and the position (the position of a sound receiving point) of a listener change, the sound according to space reverberation also varies. The reproduction apparatus is able to determine an early reflected sound by calculation, in a case in which a space varies, in a case in which the position of a sound source varies, or even in a case in which the position of a sound receiving point varies. Therefore, even when measurement of an impulse response or the like is not performed in an actual space, the reproduction apparatus is able to obtain a sound according to space reverberation, based on virtual space information. Therefore, the reproduction apparatus is able to implement reverberation that occurs in a space also including a real space, with high accuracy.

For example, the mixer 11 may function as a distribution apparatus and the mixer 21 may function as a reproduction apparatus. In addition, the reproduction apparatus does not need to be installed in each venue. For example, the server 50 shown in FIG. 15 may render the distribution data and may distribute the audio signal on which the signal processing has been performed, to a terminal or the like in each venue. In such a case, the server 50 functions as a reproduction apparatus.

The information on a sound source may include information that shows a posture (left or right orientation of a performer, for example) of a performer. The reproduction apparatus may perform processing to adjust volume or frequency characteristics, based on posture information of a performer. For example, the reproduction apparatus performs processing to reduce the volume as the left or right orientation is increased, on the basis of a case in which the orientation of the performer is directly in front. In addition, the reproduction apparatus may perform processing to attenuate a high frequency more than a low frequency as the left or right orientation is increased. As a result, since a sound varies according to the posture of a performer, the listener can watch a live performance with more realistic sensation.

Figure 17:
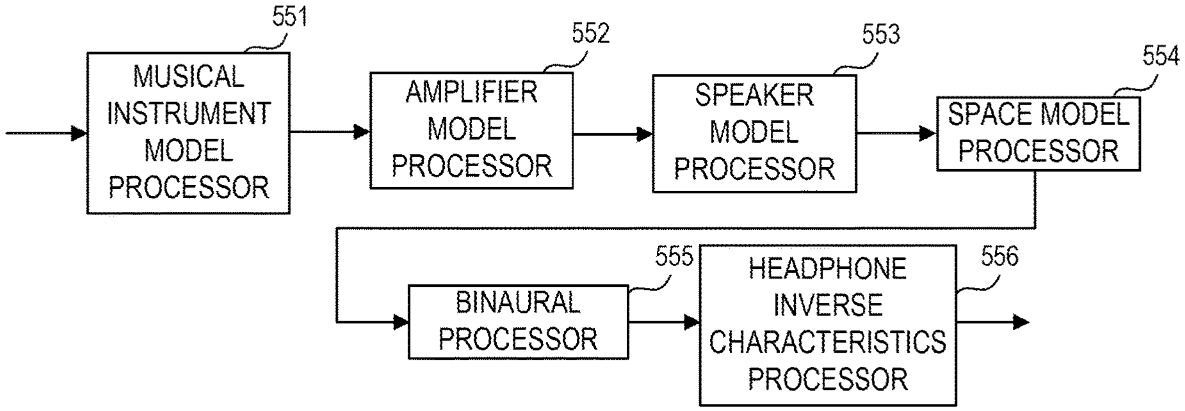
FIG. 17 is a block diagram showing an application example of signal processing performed by the reproduction apparatus.

Next, FIG. 17 is a block diagram showing an application example of signal processing performed by the reproduction apparatus. In this example, the terminal 42 and headphones 43 that are shown in FIG. 13 are used to perform rendering. The reproduction apparatus (the terminal 42 in the example of FIG. 13) functionally includes a musical instrument model processor 551, an amplifier model processor 552, a speaker model processor 553, a space model processor 554, a binaural processor 555, and a headphone inverse characteristics processor 556.

The musical instrument model processor 551, the amplifier model processor 552, and the speaker model processor 553 perform signal processing to add acoustic characteristics of an acoustic device to an audio signal according to a playing sound. A first digital signal processing model for performing the signal processing is included in the information on a sound source distributed by the distribution apparatus 12, for example. The first digital signal processing model is a digital filter to simulate each of the acoustic characteristics of a musical instrument, the acoustic characteristics of an amplifier, and the acoustic characteristics of a speaker, respectively. The first digital signal processing model is created in advance by the manufacturer of a musical instrument, the manufacturer of an amplifier, and the manufacturer of a speaker through simulation or the like. The musical instrument model processor 551, the amplifier model processor 552, and the speaker model processor 553 respectively perform digital filter processing to simulate the acoustic characteristics of a musical instrument, the acoustic characteristics of an amplifier, and the acoustic characteristics of a speaker. It is to be noted that, in a case in which the musical instrument is an electronic musical instrument such as a synthesizer, the musical instrument model processor 551 inputs note event data (information that shows pronunciation timing to be pronounced, the pitch of a sound, or the like) instead of an audio signal and generates an audio signal with the acoustic characteristics of the electronic musical instrument such as a synthesizer.

As a result, the reproduction apparatus is able to reproduce the acoustic characteristics of any musical instrument or a similar tool. For example, in FIG. 16, the live video 700 of a virtual video (computer graphics) is displayed. Herein, the listener using the reproduction apparatus may use the user I/F of the reproduction apparatus and may change to a video of another virtual musical instrument. When the listener changes the musical instrument currently displayed on the live video 700 to the video of a different musical instrument, the musical instrument model processor 551 of the reproduction apparatus performs signal processing according to the first digital signal processing model according to a changed musical instrument. As a result, the reproduction apparatus outputs a sound reproducing the acoustic characteristics of the musical instrument currently displayed on the live video 700.

Similarly, the listener using the reproduction apparatus may use the user I/F of the reproduction apparatus, and may change the type of an amplifier and the type of a speaker into a different type. The amplifier model processor 552 and the speaker model processor 553 perform digital filter processing to simulate the acoustic characteristics of an amplifier of a changed type, and the acoustic characteristics of a speaker of a changed type. It is to be noted that the speaker model processor 553 may simulate the acoustic characteristics for each direction of a speaker. In such a case, the listener using the reproduction apparatus may use the user I/F of the reproduction apparatus and may change the direction of a speaker. The speaker model processor 553 performs digital filter processing according to a changed direction of a speaker.

The space model processor 554 is a second digital signal processing model in which the acoustic characteristics (the above space reverberation, for example) of a room in the live venue is reproduced. The second digital signal processing model may be obtained at an actual live venue by use of a test sound or the like, for example. Alternatively, the second digital signal processing model, as described above, may obtain by calculation a delay amount and level of the imaginary sound source from the virtual space information (the information that shows the size, shape, wall surface material quality, and the like of the space of each venue).

When the position of a sound source and the position (the position of a sound receiving point) of a listener change, the sound according to space reverberation also varies. The reproduction apparatus is able to determine by calculation a delay amount and level of the imaginary sound source, in a case in which a space varies, in a case in which the position of a sound source varies, and even in a case in which the position of a sound receiving point varies. Therefore, even when the measurement of an impulse response or the like is not performed in an actual space, the reproduction apparatus is able to obtain a sound according to space reverberation, based on virtual space information. Therefore, the reproduction apparatus is able to implement reverberation that occurs in a space also including a real space, with high accuracy.

It is to be noted that the virtual space information may include the position and material quality of a structure (an acoustic obstacle) such as a column. The reproduction apparatus, in sound source localization and indirect sound generation processing, when an obstacle is present in a path of a direct sound and an indirect sound that reach from a sound source, reproduces phenomena of reflection, shielding, and diffraction by the obstacle.

Figure 18:
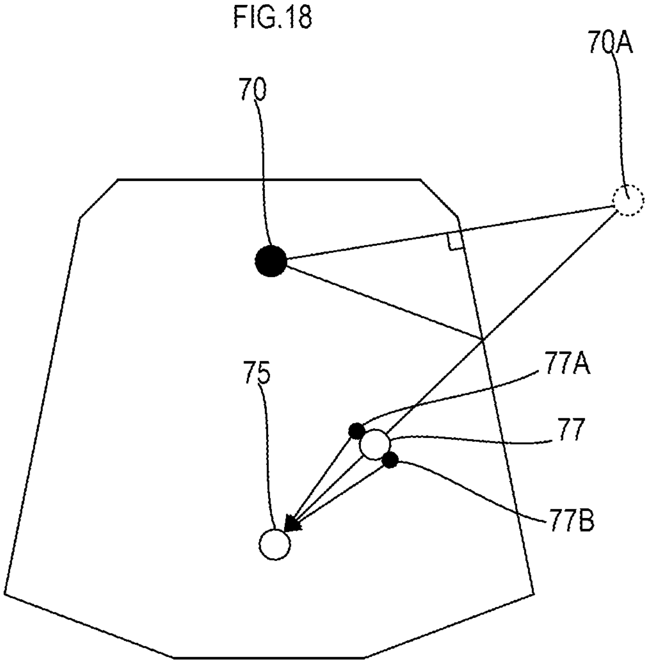
FIG. 18 is a schematic diagram showing a path of a sound reflected by a wall surface from a sound source 70 and arriving at a sound receiving point 75.

FIG. 18 is a schematic diagram showing a path of a sound reflected by a wall surface from a sound source 70 and arriving at a sound receiving point 75. The sound source 70 shown in FIG. 18 may be either of a playing sound (a first sound source) or an ambient sound (a second sound source). The reproduction apparatus determines a position of an imaginary sound source 70A that exists with the wall surface as a mirror surface with respect to the position of the sound source 70, based on the position of the sound source 70, the position of the wall surface, and the position of the sound receiving point 75. Then, the reproduction apparatus determines a delay amount of the imaginary sound source 70A, based on a distance from the imaginary sound source 70A to the sound receiving point 75. In addition, the reproduction apparatus determines a level of the imaginary sound source 70A, based on the information on the material quality of the wall surface. Furthermore, the reproduction apparatus, as shown in FIG. 18, in a case in which an obstacle 77 is present in a path from the position of the imaginary sound source 70A to the sound receiving point 75, determines frequency characteristics caused by diffraction of the obstacle 77. The diffraction attenuates a sound in the high frequency, for example. Therefore, the reproduction apparatus, as shown in FIG. 18, in the case in which the obstacle 77 is present in the path from the position of the imaginary sound source 70A to the sound receiving point 75, performs equalizer processing to reduce the level in the high frequency. The frequency characteristics caused by diffraction may be included in the virtual space information.

In addition, the reproduction apparatus may set a second imaginary sound source 77A and a third imaginary sound source 77B that are new at left and right positions of the obstacle 77. The second imaginary sound source 77A and the third imaginary sound source 77B correspond to a new sound source to be caused by diffraction. Both of the second imaginary sound source 77A and the third imaginary sound source 77B are sounds obtained by adding the frequency characteristics caused by diffraction to the sound of the imaginary sound source 70A. The reproduction apparatus recalculates the delay amount and the level, based on the positions of the second imaginary sound source 77A and the third imaginary sound source 77B, and the position of the sound receiving point 75. As a result, the diffraction phenomenon of the obstacle 77 is able to be reproduced.

The reproduction apparatus may calculate a delay amount and level of a sound such that a sound of the imaginary sound source 70A may be reflected by the obstacle 77 and may further be reflected by a wall surface, and reaches the sound receiving point 75. In addition, the reproduction apparatus, when determining that the imaginary sound source 70A is shielded by the obstacle 77, may erase the imaginary sound source 70A. The information to determine whether or not to shield may be included in the virtual space information.

The reproduction apparatus, by performing the above processing, performs the first digital signal processing that represents the acoustic characteristics of an acoustic device, and the second digital signal processing that represents the acoustic characteristics of a room, and generates a sound according to the sound of a sound source and the space reverberation.

Then, the binaural processor 555 convolves a head-related transfer function (hereinafter referred to as HRTF) into an audio signal, and performs the acoustic image localization processing on a sound source and various types of indirect sounds. The headphone inverse characteristics processor 556 performs digital filter processing to reproduce the inverse characteristics of the acoustic characteristics of the headphones that a listener uses.

By the above processing, a user can obtain realistic sensation, as if being watching a live performance in a desired space and with a desired acoustic device.

It is to be noted that the reproduction apparatus does not need to include all of the musical instrument model processor 551, the amplifier model processor 552, the speaker model processor 553, and the space model processor 554 that are shown in FIG. 17. The reproduction apparatus may execute signal processing by use of at least one digital signal processing model. In addition, the reproduction apparatus may perform signal processing using one digital signal processing model, on one certain audio signal (a sound of a certain performer, for example), or may perform signal processing using one digital signal processing model, on each of a plurality of audio signals. The reproduction apparatus may perform signal processing using a plurality of digital signal processing models, on one certain audio signal (a sound of a certain performer, for example), or may perform signal processing using a plurality of digital signal processing models, on a plurality of audio signals. The reproduction apparatus may perform signal processing using a digital signal processing model, on an ambient sound.

The description of the foregoing embodiments is illustrative in all points and should not be construed to limit the present disclosure. The scope of the present disclosure is defined not by the foregoing embodiments but by the following claims for patent. Further, the scope of the present disclosure is intended to include all modifications within the scopes of the claims for patent and within the meanings and scopes of equivalents.

What is claimed is:

1. A live data distribution method of distributing live sound data among a plurality of venues, including a first venue and a second venue, the method comprising:

obtaining distribution data including:

first information on a sound source according to sound generated at the first venue; and second information on space reverberation, the second information including third information for generating an indirect sound;

distributing the distribution data to the second venue; and rendering the distribution data and providing sound according to the distribution data at the second venue, the rendering including:

generating the indirect sound of sound of the sound source, including generating an early reflected sound that varies according to the position of the sound source.

2. The live data distribution method according to claim 1, wherein:

the first information includes an audio signal of the sound generated at the first venue and position information of the sound source, and the rendering includes localization processing of the audio signal according to the position information.

3. The live data distribution method according to claim 1, wherein the second information includes an impulse response that varies according to the position of the sound source.

4. The live data distribution method according to claim 1, wherein:

the distribution data further includes ambience information according to ambient sound, and the rendering includes processing according to the ambient information to further provide the ambient sound.

5. The live data distribution method according to claim 4, wherein:

the ambience information includes position information of the ambient sound, and the rendering includes:

localization processing of the ambient sound according to the position information of the ambient sound; and effect processing to perceive spatial expansion that is not the localization processing.

6. The live data distribution method according to claim 1, wherein:

the second information includes virtual space information for reproducing reverberation other than reverberation of the first venue, and the rendering reproduces the sound according to the space reverberation, based on the virtual space information.

7. The live data distribution method according to claim 6, further comprising:

receiving an operation to designate a space from a user at the second venue, wherein the rendering reproduces the sound according to the space reverberation, based on the virtual space information according to the designated space.

8. The live data distribution method according to claim 6, further comprising:

providing a live video to the second venue, wherein the virtual space information corresponds to the space reverberation of the live video.

9. The live data distribution method according to claim 1, wherein:

the plurality of venues include a third venue, the method further comprises distributing the distribution data to the third venue, the rendering includes providing the sound according to the distribution data at the third venue, and sound according to the space reverberation is common to the second venue and the third venue.

10. The live data distribution method according to claim 1, wherein:

the first information includes a digital signal processing model that represents acoustic characteristics of an acoustic device, and the sound generated at the first station according to the first information is provided to the second venue using the digital signal processing model.

11. The live data distribution method according to claim 1, wherein:

the second information includes a digital signal processing model that represents acoustic characteristics of a room; and sound according to the space reverberation is provided to the second venue using the digital signal processing model.

12. The live data distribution method according to claim 1, further comprising:

distributing position information that shows a position of a structure installed in the first venue, wherein the first information includes an audio signal of the sound generated at the first venue and position information of the sound source, and wherein the rendering includes signal processing the audio signal based on the position information that shows the position of the structure and the position information of the sound source.

13. The live data distribution method according to claim 1, wherein:

the second information further includes fourth information that shows a size of the space, shape of the space, and an energy loss at a time of reflection on a wall surface of the space, and the rendering generates the early reflected sound by determining a delay and a level of the sound of the space based on the fourth information.

14. The live data distribution method according to claim 1, wherein:

the second information further includes fourth information for generating a late reverberant sound that does not vary according to the position of the sound, and the rendering generates the late reverberant sound based on the fifth information.

15. A live data distribution system for distributing live sound data among a plurality of venues, including a first venue and a second venue, the system comprising:

a live data distribution apparatus including at least a first processor that obtains and distributes distribution data to the second venue, the distribution data including:

first information on a sound source according to sound generated at the first venue; and second information on space reverberation, the second information including third information for generating an indirect sound; and a live data reproduction apparatus including at least a second processor that renders the distribution data and provides sound according to the distribution data at the second venue, in rendering the distribution data, the second processor:

generates the indirect sound of sound of the sound source, including generating an early reflected sound that varies according to the position of the sound source.

16. The live data distribution system according to claim 15, wherein:

the first information on the sound source includes an audio signal of the sound generated at the first venue and position information of the sound source; and the rendering by the at least the second processor includes localization processing of the audio signal according to the position information.

17. The live data distribution system according to claim 15, wherein the second information includes an impulse response that varies according to the position of the sound source.

18. The live data distribution system according to claim 15, wherein:

the distribution data further includes ambience information according to ambient sound, and the rendering by the at least the second processor includes processing according to the ambient information to further provide the ambient sound.

19. The live data distribution system according to claim 15, wherein:

the second information includes virtual space information for reproducing reverberation other than reverberation of the first venue , and the rendering by the at least the second processor reproduces the sound according to the space reverberation, based on the virtual space information.

20. A live data distribution apparatus for distributing live sound data among a plurality of venues, including a first venue and a second venue, the live data distribution apparatus comprising:

at least one processor that:

obtains distribution data including:

first information on a sound source according to sound generated at the first venue; and second information on space reverberation, the second information including third information for generating an indirect sound; and distributes the distribution data to the second venue, wherein the distribution data is caused to be rendered by a reproduction apparatus at the second venue and provide sound according to the distribution data at the second venue, in rendering the distribution data, the reproduction apparatus:

generates the indirect sound of sound of the sound source, including generating an early reflected sound that varies according to the position of the sound source.

* * * * *